(12) United States Patent
Go et al.

(10) Patent No.: US 12,556,447 B2
(45) Date of Patent: Feb. 17, 2026

(54) IN-VEHICLE DEVICE, INFORMATION PROCESSING METHOD, AND PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Darmawan Go, Yokkaichi (JP); Hirofumi Urayama, Yokkaichi (JP); Tatsuya Izumi, Osaka (JP); Hideyuki Tanaka, Osaka (JP); Yusuke Yamamoto, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 298 days.

(21) Appl. No.: 18/557,096

(22) PCT Filed: Mar. 17, 2022

(86) PCT No.: PCT/JP2022/012279
§ 371 (c)(1),
(2) Date: May 14, 2024

(87) PCT Pub. No.: WO2022/230434
PCT Pub. Date: Nov. 3, 2022

(65) Prior Publication Data
US 2024/0291713 A1 Aug. 29, 2024

(30) Foreign Application Priority Data
Apr. 28, 2021 (JP) .................................. 2021-076605

(51) Int. Cl.
*H04L 41/082* (2022.01)
*B60R 16/023* (2006.01)
(Continued)

(52) U.S. Cl.
CPC .......... *H04L 41/082* (2013.01); *B60R 16/023* (2013.01); *H04L 12/28* (2013.01); *H04L 2012/40273* (2013.01)

(58) Field of Classification Search
None
See application file for complete search history.

(56) References Cited

U.S. PATENT DOCUMENTS 8,198,994 B2 * 6/2012 Ferren ...................... G09G 5/00
348/222.1
8,694,328 B1 * 4/2014 Gormley ............. B60W 30/182
705/26.7

(Continued)

FOREIGN PATENT DOCUMENTS

CN 106209489 B * 12/2021
CN 110247915 B * 4/2023

(Continued)

OTHER PUBLICATIONS

International Search Report, Application No. PCT/JP2022/012279, mailed May 17, 2022. ISA/Japan Patent Office.

*Primary Examiner* — Sandarva Khanal
(74) *Attorney, Agent, or Firm* — Honigman LLP

(57) ABSTRACT

An in-vehicle device that is mounted on a vehicle and is connected to a relay device through an in-vehicle network such that communication is available, the device including a control unit performing processing relevant to network setting information used by the relay device, in which the control unit acquires user information relevant to a user of the vehicle, outputs the acquired user information to a vehicle exterior server provided outside the vehicle, acquires (Continued)

information of an available service that can be used by the user from the vehicle exterior server, and outputs a network setting change instruction generated on the basis of the acquired information of the available service to the relay device or an in-vehicle ECU.

13 Claims, 13 Drawing Sheets

(51) Int. Cl.
  *H04L 12/28* (2006.01)
  *H04L 12/40* (2006.01)

(56) References Cited

U.S. PATENT DOCUMENTS

| | | | |
|---|---|---|---|
| 8,825,222 B2* | 9/2014 | Namburu | B60R 16/037 |
| | | | 701/1 |
| 9,171,268 B1* | 10/2015 | Penilla | B60L 1/06 |
| 9,229,905 B1* | 1/2016 | Penilla | G06Q 20/18 |
| 9,963,012 B2* | 5/2018 | Stevanovic | B60H 1/00971 |
| 11,536,581 B2* | 12/2022 | Williams | G05D 1/0022 |
| 11,763,268 B2* | 9/2023 | Solomon | B60R 16/0234 |
| | | | 705/4 |
| 2004/0092253 A1* | 5/2004 | Simonds | B60R 16/0315 |
| | | | 455/414.1 |
| 2016/0117928 A1* | 4/2016 | Hodges | G06F 3/04842 |
| | | | 701/99 |
| 2017/0139778 A1 | 5/2017 | Kito et al. | |
| 2017/0282821 A1* | 10/2017 | Zych | B60R 16/037 |
| 2020/0152197 A1* | 5/2020 | Penilla | H04L 67/125 |
| 2023/0393867 A1* | 12/2023 | Penilla | H01M 10/425 |

FOREIGN PATENT DOCUMENTS

| | | | | |
|---|---|---|---|---|
| DE | 102017108398 A1 * | 11/2017 | | |
| JP | 2011-073565 A | 4/2011 | | |
| JP | 2019-034684 A | 3/2019 | | |
| WO | WO-2017172415 A1 * | 10/2017 | | G06Q 10/0631 |

* cited by examiner

FIG. 3

| User ID | Date and time of use (a history) | Available vehicle | Available service name | Communication traffic volume | Relay-related information | NW setting information |
|---|---|---|---|---|---|---|
| U001 | yy/mm/dd/hh:mm | Y | Service-A | 50Mbps | yy-A.xml | Y-A.xml |
| | yy/mm/dd/hh:mm | X | Service-A | 30Mbps | xx-A.xml | X-A.xml |
| | | | Service-C | 10Mbps | xx-C.xml | X-C.xml |
| U002 | yy/mm/dd/hh:mm | Z | Service-B | 70Mbps | zz-B.xml | Z-B.xml |
| . | . | . | . | . | . | . |

FIG. 4

| A communication traffic volume (an actual measurement value) of each port | Buffer retention volume (an actual measurement value) | Quality information (an actual measurement value) |
|---|---|---|
| port1:1xMbps<br>port2:1yMbps<br>port3:1zMbps | 80kB | No Discard |

FIG. 5

| User ID | Available service name | Provision ECU | Request ECU | Communication route (the network setting information) | | | |
|---|---|---|---|---|---|---|---|
| | | | | Vehicle X | Vehicle Y | Vehicle Z | Vehicle ··· |
| U001 | Service-A | ECU41 | ECU43 | ECU41-SW1-ECU43 | ECU41-SW1-CTL-SW2-ECU43 | Not available: insufficient bandwidth | · |
| | Service-C | ECU42 | ECU45 | ECU42-SW1-CTL-SW2-ECU45 | Not available: ECU45 not mounted | Not available: ECU42 not mounted | · |
| U002 | Service-B | ECU44 | ECU41 | ECU44-SW2-CTL-SW1-ECU41 | ECU44-SW2-CTL-SW1-ECU41 | ECU44-SW2-CTL-SW1-ECU41 | · |
| | | | ECU42 | ECU44-SW2-CTL-SW1-ECU42 | ECU44-SW2-CTL-SW1-ECU42 | Not available: ECU42 not mounted | · |
| · | · | · | · | · | · | · | · |

IN-VEHICLE DEVICE, INFORMATION PROCESSING METHOD, AND PROGRAM

CROSS-REFERENCE TO RELATED APPLICATIONS

This application is the U.S. national stage of PCT/JP2022/012279 filed on Mar. 17, 2022, which claims priority of Japanese Patent Application No. JP 2021-076605 filed on Apr. 28, 2021, the contents of which are incorporated herein.

TECHNICAL FIELD

The present disclosure relates to an in-vehicle device, an information processing method, and a program.

BACKGROUND

An in-vehicle electronic control unit (ECU) for controlling in-vehicle equipment such as a powertrain system of engine control and a body system of air conditioner control is mounted on a vehicle. The in-vehicle ECU includes an arithmetic processing unit such as MPU, a rewritable non-volatile storage unit such as RAM, and a communication unit for communicating with another in-vehicle ECU, and controls the in-vehicle equipment by reading and executing a control program stored in the storage unit. Further, a relay device having a wireless communication function is mounted on the vehicle, and thus, the vehicle communicates with a program provision device connected to a vehicle exterior network through the relay device such that the control program of the in-vehicle ECU can be downloaded (received) from the program provision device, and the control program of the in-vehicle ECU can be updated (for example, refer to Japanese Patent Laid-Open Publication No. 2017-97851).

In the relay device of Japanese Patent Laid-Open Publication No. 2017-97851, there is a problem that processing of inheriting the setting information used when performing relay control is not considered.

An object of the present disclosure is to provide an in-vehicle device and the like capable of inheriting setting information of a relay device that has been applied in another vehicle.

SUMMARY

An in-vehicle device according to one aspect of the present disclosure is an in-vehicle device that is mounted on a vehicle and is connected to a relay device through an in-vehicle network such that communication is available, the device including a control unit performing processing relevant to network setting information used by the relay device, in which control unit acquires user information relevant to a user of the vehicle, outputs the acquired user information to a vehicle exterior server provided outside the vehicle, acquires information of an available service that can be used by the user from the vehicle exterior server, and outputs a network setting change instruction generated on the basis of the acquired information of the available service to the relay device or an in-vehicle ECU.

Effects of Present Disclosure

According to one aspect of the present disclosure, it is possible to provide the in-vehicle device and the like inheriting the setting information of the relay device that has been applied in another vehicle.

BRIEF DESCRIPTION OF DRAWINGS

FIG. 2 is a block diagram exemplifying a configuration of the in-vehicle device and the like.

FIG. 3 is an explanatory diagram illustrating an example of an available service history table (available service history information).

FIG. 4 is an explanatory diagram illustrating an example of relay-related information and the like.

FIG. 5 is an explanatory diagram illustrating an example of a network setting information table (a communication route).

FIG. 6 is an explanatory diagram (a sequence diagram) exemplifying one aspect of each processing piece of the in-vehicle device and the like.

DETAILED DESCRIPTION OF PREFERRED EMBODIMENTS

Figure 1:
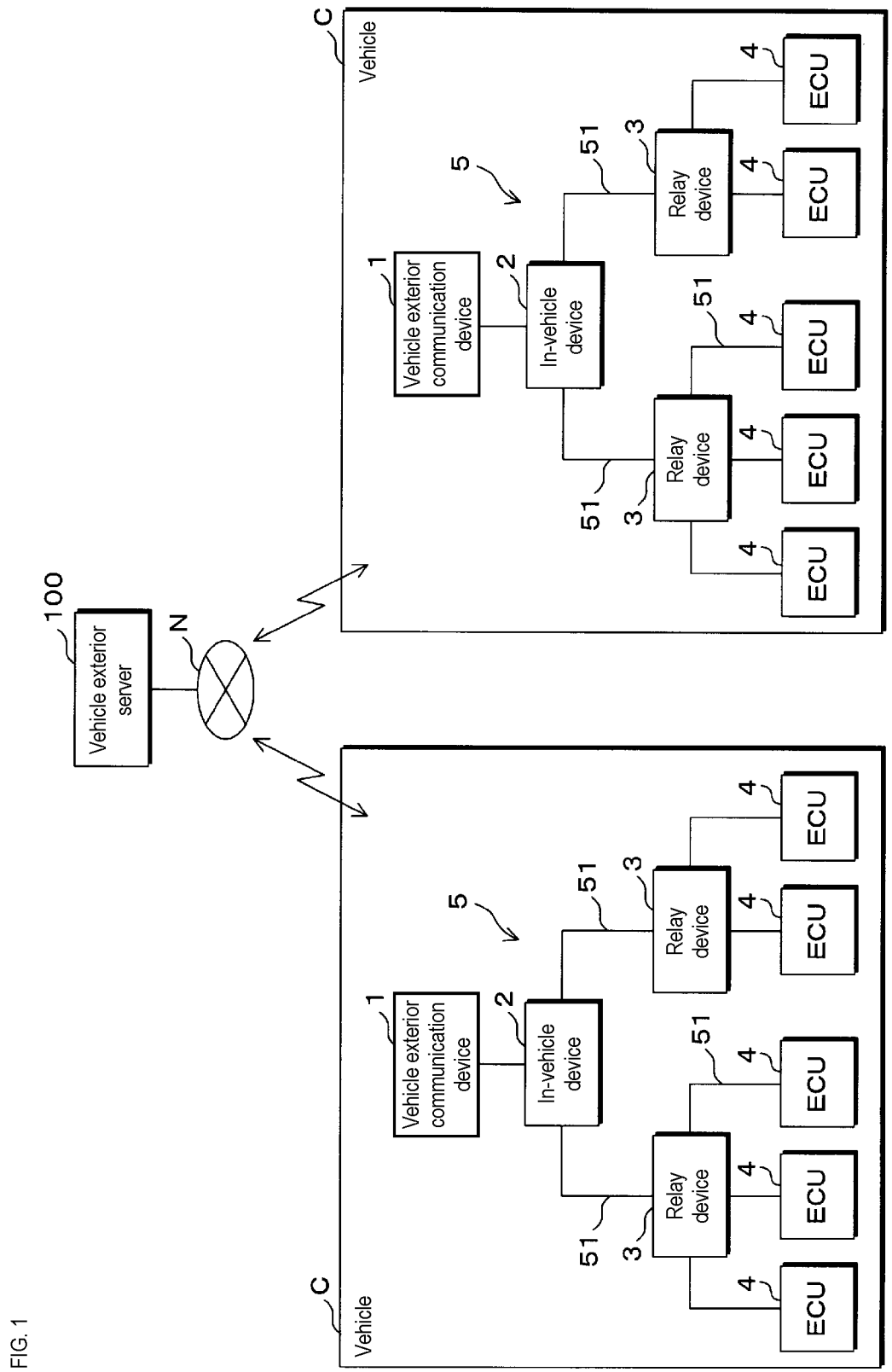
FIG. 1 is a schematic view exemplifying a configuration of an in-vehicle system including an in-vehicle device according to Embodiment 1.

First, embodiments of the present disclosure will be enumerated and described. In addition, at least a part of the embodiments described below may be arbitrarily combined.

An in-vehicle device according to one aspect of the present disclosure is an in-vehicle device that is mounted on a vehicle and is connected to a relay device through an in-vehicle network such that communication is available, the device including a control unit performing processing relevant to network setting information used by the relay device, in which the control unit acquires user information relevant to a user of the vehicle, outputs the acquired user information to a vehicle exterior server provided outside the vehicle, acquires information of an available service that can be used by the user from the vehicle exterior server, and outputs a network setting change instruction generated on the basis of the acquired information of the available service to the relay device.

In this aspect, the control unit of the in-vehicle device, for example, acquires the user information, and outputs the user information to the vehicle exterior server, by receiving a user approval manipulation that is performed by the user of the vehicle (the own vehicle) on which the own device is mounted. When the user information is output to the vehicle exterior server, for example, the control unit of the in-vehicle device may acquire information (provided service information) of a service (a provided service) that can be provided to the user by the own vehicle, and may also output the provided service information to the vehicle exterior server, by referring to a predetermined accessible storage region such as a storage unit of the in-vehicle device. The control unit of the in-vehicle device acquires the information (available service information) of the available service that can be used by the user from the vehicle exterior server. In the vehicle exterior server, information of an available service that is used by the user in another vehicle is stored in accordance with a usage history (an available service history) of the user. When the available service is transferred and used between different vehicles, the information of the available service is information to be inherited to the relay device of the vehicle, which is a transfer destination. The control unit of the in-vehicle device outputs the network setting change instruction generated on the basis of the acquired information of the available service to the relay device, an in-vehicle ECU, or the relay device and the in-vehicle ECU. The control unit of the in-vehicle device creates (initializes) network setting information for the own vehicle, in accordance with a service identifier for specifying the configuration of the in-vehicle ECU and the like mounted on the own vehicle and the type of available service, and reflects the acquired information of the available service on the created network setting information, and thus, may correct the created network setting information to network setting information that is actually used. The control unit of the in-vehicle device generates the network setting change instruction by using the network setting information on which the information of the available service is reflected, and outputs the network setting change instruction. Accordingly, in a case where there is the available service to be transferred between different vehicles, it is possible to inherit the network setting information of the relay device that has been applied in another vehicle, by using the network setting information on which the information of the available service is reflected. Accordingly, the available service used in another vehicle can be transferred and used in the vehicle (the own vehicle) on which the in-vehicle device is mounted.

In the in-vehicle device according to one aspect of the present disclosure, the control unit outputs the information of the available service acquired from the vehicle exterior server, receives selection of the user in the output information of the available service, and outputs a network setting change instruction generated on the basis of the selected available service to the relay device.

In this aspect, the information of the available service acquired from the vehicle exterior server may include information relevant to a plurality of available services, on the basis of the history of the available service used by the user in another vehicle. Even in such a case, the control unit outputs the information of the available service acquired from the vehicle exterior server, for example, to a display device or the like in a list format, and thus, is capable of displaying each of the available services on the display device, and allowing the user to select any of the available services. The control unit receives the selection of one or more available services by the user, and outputs the network setting information changed on the basis of the selected available service (the network setting information generated by the control unit), or the network setting change instruction generated on the basis of inheritance source network setting information corresponding to the available service to the relay device, and thus, is capable of performing the transfer of the available service according to the selection by the user.

In the in-vehicle device according to one aspect of the present disclosure, inheritance source network setting information to be inherited to the relay device when using the available service is acquired from the vehicle exterior server, and a network setting change instruction generated on the basis of the acquired information of the available service and inheritance source network setting information is output to the relay device.

In this aspect, the control unit of the in-vehicle device acquires the information (the available service information) of the available service that can be used by the user, and the inheritance source network setting information associated with the available service information from the vehicle exterior server. In the vehicle exterior server, the information of the available service used by the user in another vehicle, and the network setting information (the inheritance source network setting information) of the relay device corresponding to the available service are stored in accordance with the usage history (the available service history) of the user. When the available service is transferred and used between different vehicles, the inheritance source network setting information is the information to be inherited to the relay device of the vehicle, which is a transfer destination. The control unit of the in-vehicle device outputs the network setting change instruction generated on the basis of the inheritance source network setting information to the relay device, the in-vehicle ECU, or the relay device and the in-vehicle ECU. Accordingly, in a case where there is the available service to be transferred between different vehicles, it is possible to inherit the network setting information of the relay device that has been applied in another vehicle, by acquiring the inheritance source network setting information corresponding to the available service. Accordingly, the available service used in another vehicle can be transferred and used in the vehicle (the own vehicle) on which the in-vehicle device is mounted.

In the in-vehicle device according to one aspect of the present disclosure, the inheritance source network setting information includes information relevant to a communication route within the in-vehicle network specified in accordance with the available service.

In this aspect, the inheritance source network setting information includes the information relevant to the communication route within the in-vehicle network specified in accordance with the available service, and thus, it is possible to efficiently generate the network setting change instruction, on the basis of the information relevant to the communication route.

In the in-vehicle device according to one aspect of the present disclosure, the control unit acquires inheritance source network setting information after conversion that is converted by the vehicle exterior server, and outputs a network setting change instruction generated on the basis of the inheritance source network setting information after conversion to the relay device.

In this aspect, the control unit of the in-vehicle device acquires the inheritance source network setting information after conversion that is converted by the vehicle exterior server, and outputs the network setting change instruction generated on the basis of the inheritance source network setting information after conversion to the relay device. Accordingly, in a case where there is a difference in an actuator, the in-vehicle ECU, the communication route, or the like, which is mounted, in the vehicle mounted with the relay device to which the inheritance source network setting information has been applied and the vehicle (the own vehicle) mounted with the relay device, which is an inheritance destination, it is possible to absorb the difference by using the inheritance source network setting information after conversion that is converted by the vehicle exterior server. Accordingly, when the available service is transferred between the vehicles, even in a case where there is a difference in the communication route or the like mounted on the vehicles, the available service can be transferred between the vehicles, and the same available service can be used in different vehicles.

In the in-vehicle device according to one aspect of the present disclosure, the control unit converts the acquired inheritance source network setting information, and outputs a network setting change instruction generated on the basis of the inheritance source network setting information after conversion to the relay device.

In this aspect, the control unit of the in-vehicle device determines whether the acquired inheritance source network setting information is converted, on the basis of a difference in the actuator, the in-vehicle ECU, the communication route, or the like mounted on the vehicle mounted with the relay device to which the inheritance source network setting information has been applied and the vehicle (the own vehicle) mounted with the relay device, which is an inheritance destination of the inheritance source network setting information. In a case where there is a difference in the communication route or the like, the control unit of the in-vehicle device determines that the conversion is required, and converts the inheritance source network setting information, and thus, the available service can be transferred between the vehicles, and the same available service can be used in different vehicles.

In the in-vehicle device according to one aspect of the present disclosure, the control unit acquires information of an available service that has been applied to the vehicle, acquires network setting information corresponding to the applied available service from the relay device, and outputs the information of the applied available service and the network setting information to the vehicle exterior server, in association with the user information.

In this aspect, the control unit of the in-vehicle device outputs the information (information of a service in use) of the available service applied to the vehicle (the own vehicle), and network setting information corresponding to the service in use to the vehicle exterior server, in association with the user information. Accordingly, the information of the available service applied in the vehicle can be stored in the vehicle exterior server, and information (available service history information) relevant to the usage history of the available service of the user can be updated. The available service history information that is updated as described above can be used later when the user transfers the available service in another vehicle, and user-friendliness for the user can be continuously improved.

In the in-vehicle device according to one aspect of the present disclosure, the control unit acquires information relevant to a communication state in a period of using the applied available service from the relay device, and outputs the information relevant to the communication state, the information of the applied available service, and the network setting information to the vehicle exterior server, in association with the user information.

In this aspect, the control unit of the in-vehicle device also outputs the information relevant to the communication state in the period of using the applied available service, which is acquired from the relay device, to the vehicle exterior server, in association with the user information, and thus, the communication state when the available service is applied can also be stored in the vehicle exterior server.

A program according to one aspect of the present disclosure is a program for allowing a computer that is mounted on a vehicle and is connected to a relay device through an in-vehicle network such that communication is available to execute processing of: acquiring user information relevant to a user of the vehicle: outputting the acquired user information to a vehicle exterior server provided outside the vehicle: acquiring information of an available service that can be used by the user and inheritance source network setting information to be inherited to the relay device when using the available service from the vehicle exterior server; and outputting a network setting change instruction generated on the basis of the acquired inheritance source network setting information to the relay device.

In this aspect, the computer can be used as the in-vehicle device inheriting the setting information of the relay device that has been applied in another vehicle.

An information processing method according to one aspect of the present disclosure is an information processing method for allowing a computer that is mounted on a vehicle and is connected to a relay device through an in-vehicle network such that communication is available to execute processing of: acquiring user information relevant to a user of the vehicle; outputting the acquired user information to a vehicle exterior server provided outside the vehicle: acquiring information of an available service that can be used by the user and inheritance source network setting information to be inherited to the relay device when using the available service from the vehicle exterior server; and outputting a network setting change instruction generated on the basis of the acquired inheritance source network setting information to the relay device.

In this aspect, the information processing method for inheriting the setting information of the relay device that has been applied in another vehicle can be provided by the computer.

Specific examples of an in-vehicle device 2 and the like according to embodiments of the present disclosure will be described below with reference to the drawings. Note that, the present disclosure is not limited to the exemplification, but is indicated by the claims, and is intended to include all modifications within the meaning and the scope equivalent to the claims.

Figure 2:
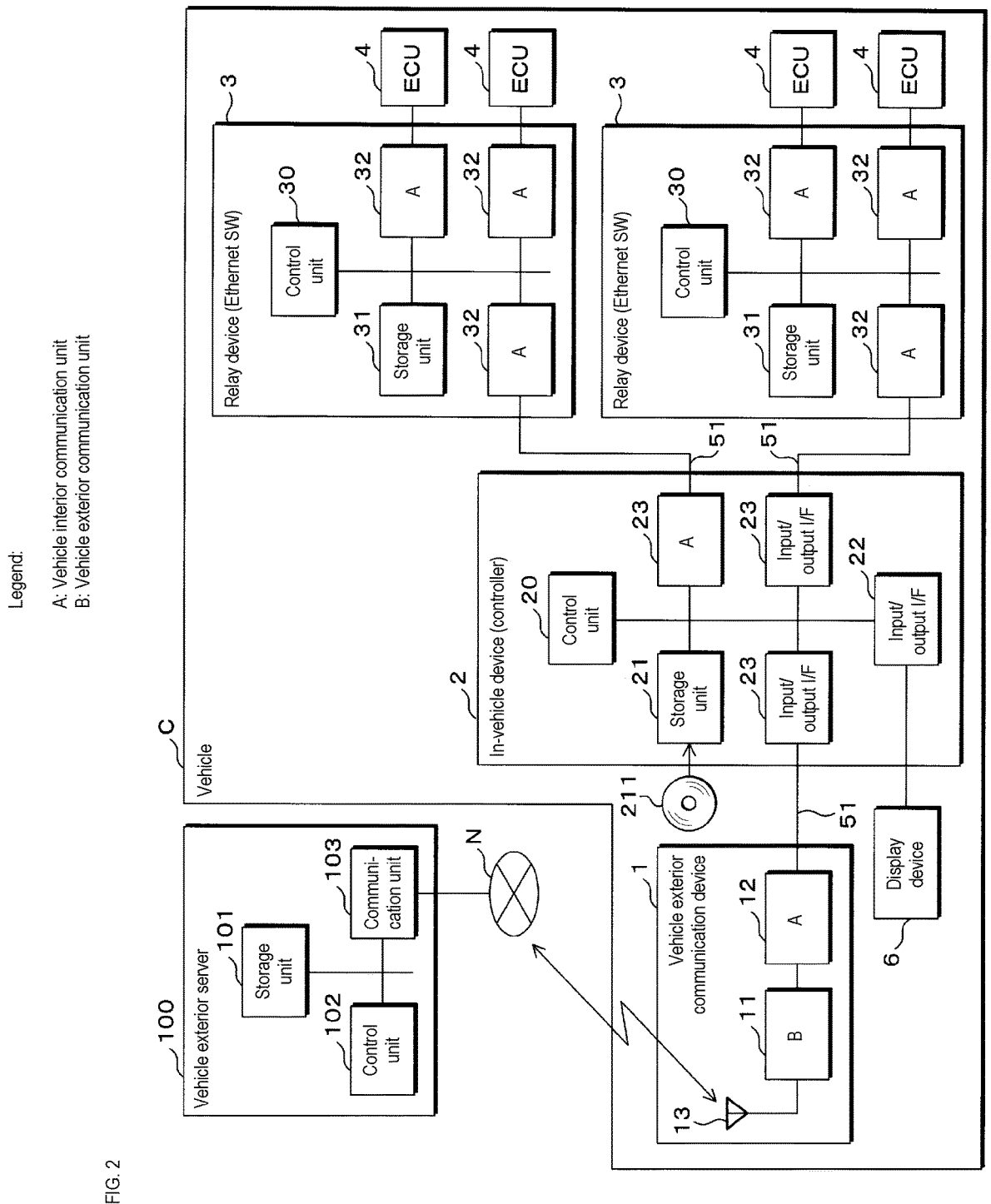

Hereinafter, the embodiments will be described on the basis of the drawings. FIG. 1 is a schematic view exemplifying the of an in-vehicle system S including the in-vehicle device 2 according to Embodiment 1. FIG. 2 is a block diagram exemplifying the configuration of the in-vehicle device 2 and the like. The in-vehicle system S includes a vehicle exterior communication device 1 mounted on a vehicle C, the in-vehicle device 2, a relay device 3, and an in-vehicle ECU 4, and the in-vehicle device 2 is connected to a vehicle exterior server 100, which is connected to a vehicle exterior network N, through the vehicle exterior communication device 1 such that communication is available.

The vehicle exterior server 100, for example, is a computer such as a server that is connected to the vehicle exterior network N such as the internet or a public network, and includes a control unit 102 such as CPU, a storage unit 101, and a communication unit 103. The storage unit 101 includes random access memory (RAM), a read only memory (ROM), a hard disk, or the like. The storage unit 101 stores network setting information for controlling the relay device 3 and the like mounted on the vehicle C. The communication unit 103, for example, is a communication I/F corresponding to Ethernet (Registered Trademark).

The vehicle exterior server 100 is connected to a plurality of vehicles C through the vehicle exterior network N such that communication is available, and acquires relay-related information and available service history information from the vehicles C, and thus, aggregates history information of an available service applied in each of the plurality of vehicles C and vehicle state information including the network setting information when using the available service. The available service history information and the vehicle state information (the network setting information) transmitted from each of the vehicles C, and user information for identifying the user of the vehicle C (the user of the available service) are transmitted to the vehicle exterior server 100 from the vehicle C, in association with each other. Accordingly, the vehicle exterior server 100 is capable of accurately grasping the acquired available service history information and the like as an available service history for each of the users. The available service history information is used to convert the network setting information used in each of the vehicles C. That is, the network setting information applied in each of the vehicles C is converted on the basis of the available service history information of the same user. Accordingly, when the same user manipulates different vehicles C, the available service history information of the available service used in another vehicle C is reflected on the network setting information of the vehicle C that is currently manipulated, and thus, the available service can be inherited between different vehicles C. As described above, a storage device that functions as a storage medium for inheriting the available service history information between different vehicles C is not limited to the vehicle exterior server 100, and may be a mobile terminal device such as a smart phone that is retained by the user. The vehicle C may be connected to the mobile terminal device, which is retained by the user of the vehicle C, through the vehicle exterior communication device 1 described below such that communication is available, and may transmit and receive the available service history information and the like with respect to the mobile terminal device.

The vehicle exterior server 100 transmits the aggregated available service history information and vehicle state information (network setting information) to each of the vehicles C, and thus, the available service history information and the like are distributed to the plurality of vehicles C. The communication between the vehicle exterior server 100 and the vehicle C is performed in a case where user authentification (login) based on the user information of the vehicle C is performed. After the end (logout) of the user by the user of the vehicle C, the user authentification (the login) based on the user information of the user in another vehicle C can be performed. That is, for a specific user, the vehicle exterior server 100 is capable of communicating only with the vehicle C being used (being logged in) by the user, and may be restricted such that a plurality of simultaneous logins of the specific user is not available (a plurality of logins of the same user at the same time are prohibited). As described above, the available service specified by the user of the vehicle C (the user of the available service) can be transferred between different vehicles C. In a case where there is a configurational difference in the vehicles C when transferring any of the available services between different vehicles C, the vehicle exterior server 100 changes the network setting information. Accordingly, even in a case where there is a configurational difference between the vehicle C, which is a transfer source, and the vehicle C, which is a transfer destination, it is possible to transfer the available service to the vehicle C, which is a transfer destination. The details of communication processing between the vehicle exterior server 100 and the vehicle C will be described below. The vehicle exterior server 100 may be an over the air (OTA) server that transmits (distributes) a control program of the in-vehicle device 2, the relay device 3, the in-vehicle ECU 4, and the like, which are mounted on the vehicle C, to the vehicle C, and updates various control programs applied in the vehicle C.

The vehicle exterior communication device 1, the in-vehicle device 2, the relay device 3, and a plurality of in-vehicle ECUs 4 for controlling various in-vehicle equipments (a sensor and an actuator) are mounted on the vehicle C. The vehicle exterior communication device 1 and the in-vehicle device 2, for example, are connected by a communication line 51 (an Ethernet cable) corresponding to a communication protocol such as Ethernet such that communication is available. A plurality of relay devices 3 are connected to the in-vehicle device 2 by the communication line 51, and thus, a cascade-shaped in-vehicle network 5 is configured. The plurality of in-vehicle ECUs 4 are connected to the relay device 3 by the communication line 51 such that communication is available. A communication connection form in the in-vehicle network 5 is not limited to Ethernet, and for example, may be a CAN bus corresponding to a communication protocol such as CAN.

The vehicle exterior communication device 1 includes a vehicle exterior communication unit 11 and a vehicle interior communication unit 12. The vehicle interior communication unit 12, for example, is an Ethernet PHY unit corresponding to a TCP/IP packet transmitted by the communication line 51 using the Ethernet cable such as 100BASE-T1 or 1000BASE-T1. The vehicle exterior communication device 1 is connected to the in-vehicle device 2 such that communication is available through the vehicle interior communication unit 12, and the communication line 51 such as an Ethernet cable.

The vehicle exterior communication unit 11 is a communication device for performing wireless communication by using a mobile communication protocol such as 4G, 5G, and WiFi, and transmits and receives data with respect to the vehicle exterior server 100 through an antenna 13 connected to the vehicle exterior communication unit 11. The communication between the vehicle exterior communication device 1 and the vehicle exterior server 100, for example, is performed through the vehicle exterior network N such as a public network or the internet.

In this embodiment, the vehicle exterior communication device 1 is a device separate from the in-vehicle device 2, and such devices are connected by the vehicle interior communication unit 12 and the like such that communication is available, but the present disclosure is not limited thereto. The vehicle exterior communication device 1 may be built in the in-vehicle device 2, as one component of the in-vehicle device 2.

The in-vehicle device 2 includes a control unit 20, a storage unit 21, an input/output I/F 22, a vehicle interior communication unit 23, and the like. The in-vehicle device 2, for example, includes a central control device (a controller) such as a vehicle computer, and may be an integrated ECU controlling the entire vehicle C. The in-vehicle device 2 may monitor a state (a vehicle state) according to a usage scene of the vehicle C, and may perform switch control of the vehicle state or control relevant to the available service used in the vehicle C. The in-vehicle device 2 outputs (transmits) a network setting change instruction to the relay device 3, in accordance with the vehicle state or the switch of the available service, and performs control processing of changing the network setting of the relay device 3. The in-vehicle device 2 may be the relay device 3. For example, in a case where the in-vehicle network 5 is a cascade-shaped topology, the relay device 3 positioned at the highest level may function as the in-vehicle device 2 in this embodiment, and may perform the control processing of changing the network setting of another relay device 3 connected to the lower level.

The control unit 20 includes a central processing unit (CPU), a micro processing unit (MPU), or the like. The control unit 20 reads out and executes each program and data piece stored in advance in the storage unit 21 to perform various control processing pieces, arithmetic processing, and the like. Each of the programs and the like stored in the storage unit 21 may be a control program read out from a recording medium 211 readable by the in-vehicle device 2. In addition, each of the programs and the like stored in the storage unit 21 may be stored in the storage unit 21 by downloading a program from an external computer (not illustrated) connected to a communication network (not illustrated).

The storage unit 21 includes a volatile memory element such as a random access memory (RAM), and a non-volatile memory element such as a read only memory (ROM), an electrically erasable programmable ROM (EEPROM), or a flash memory. The storage unit 21 stores network setting information corresponding to each of the relay devices 3. Further, the storage unit 21 stores (accumulates) relay-related information acquired from each of the relay devices 3. The relay-related information acquired from the relay device 3 includes setting information stored in a device in the vehicle C, among the network setting information used by the relay device 3, and information relevant to a communication state in a period of performing relay processing by the relay device 3 using the network setting information. The information relevant to the communication state is information such as a communication traffic volume (an actual measurement value), a buffer retention volume (an actual measurement value), and quality information (an actual measurement value). The device in the vehicle C that stores the network setting information, for example, may be a device such as the in-vehicle device 2 or the relay device 3. Here, in a case where a device storing the network setting information is in the vehicle C, the device may be used. The setting information stored in the device in the vehicle C, among the network setting information, indicates information that is capable of uniquely specifying the network setting information set in each of the relay devices 3 of the vehicle C by the vehicle exterior server 100. For example, in a case where the network setting information set in the relay device 3 by the vehicle exterior server 100 can be specified by a Ver number indicating the version of the network setting information, among the network setting information, the setting information may be the Ver number.

The input/output I/F 22, for example, is a communication interface for serial communication. The in-vehicle device 2 is connected to a display device 6 such as a display and an IG switch (not illustrated) for starting and stopping the vehicle C through the input/output I/F 22 such that communication is available.

The vehicle interior communication unit 23, for example, is an input/output interface (the Ethernet PHY unit) using a communication protocol such as Ethernet, and the control unit 20 communicates with the relay device 3, the in-vehicle ECU 4, or the vehicle exterior communication device 1, which is connected to the in-vehicle network 5, through the vehicle interior communication unit 23. A plurality of vehicle interior communication units 23 are provided, and the communication line 51 configuring the in-vehicle network 5 is connected to each of the vehicle interior communication units 23.

As with the in-vehicle device 2, the relay device 3 includes a control unit 30, a storage unit 31, and a vehicle interior communication unit 32, and the configuration of each function unit has the same as that of the function unit of the in-vehicle device 2. The relay device 3, for example, is an Ethernet switch (Ethernet SW) that functions as a layer 2 switch or a layer 3 switch. The storage unit 31 of the relay device 3 stores network setting information for performing relay control (switching control). The network setting information stored in the storage unit 31 of the relay device 3 is information that is specified on the basis of the network setting change instruction (the network setting information) output (transmitted) from the in-vehicle device 2, and is information corresponding to each vehicle state such as the usage scene of the vehicle C. The details of the network setting information will be described below.

As with the in-vehicle device 2 or the relay device 3, the in-vehicle ECU 4 includes a control unit (not illustrated), a storage unit (not illustrated), and a vehicle interior communication unit (not illustrated), and is connected to any of the relay devices 3. The in-vehicle ECUs 4 may perform inter-service communication through the relay device 3 to further communicate with the in-vehicle device 2. The in-vehicle ECU 4 may acquire (receive) information relevant to the switch of the vehicle state (the usage scene and the like), or the network setting change instruction (the network setting information) as with the relay device 3, from the in-vehicle device 2, and may respond to the switch of the vehicle state (the usage scene and the like).

FIG. 3 is an explanatory diagram illustrating an example of an available service history table (the available service history information). FIG. 4 is an explanatory diagram illustrating an example of the relay-related information and the like. The history information of the available service (the available service history information) and the relay-related information, which are transmitted to the vehicle exterior server 100 from each of the plurality of vehicles C connected to the vehicle exterior server 100 such that communication is available and is aggregated in the vehicle exterior server 100, for example, are stored in the storage unit 101 of the vehicle exterior server 100, as the available service history table in a table format.

The available service history table includes a user ID, a date and time of use (a history), an available vehicle, an available service name, a communication traffic volume, relay-related information, and NW setting information, as a management item (a field) of the table. In the management item (the field) of the user ID, an identification number (the user ID) for identifying the user using the available service in the vehicle C is stored. In the management item (the field) of the date and time of use (the history), the date and time (the date and time of use) when the user uses the available service is stored.

In the management item (the field) of the available vehicle, information relevant to the vehicle C (the available vehicle) for which the user uses the available service is stored. The information relevant to the available vehicle, for example, may be vehicle model information or a vehicle C identification number (a vehicle identification number: VIN).

In the management item (the field) of the available service name, the name or the type of available service used by the user is stored. The available service, for example, is a service according to the usage pattern (the usage scene) of the vehicle C, such as an autonomous driving service and a car-sharing service.

In the management item (the field) of the communication traffic volume, a part or an aggregate value of the relay-related information collected by the relay device 3 mounted on the vehicle C, such as a communication traffic in the vehicle C when the user uses the available service, may be stored. There are two types of communication traffic volumes of a communication traffic volume when the in-vehicle device 2 or the relay device 3 transmits data to another in-vehicle ECU 4 and a traffic volume when the in-vehicle device 2 or the relay device 3 receives data from another in-vehicle ECU 4.

In the management item (the field) of the relay-related information, the detailed information such as the entire data of the relay-related information in the vehicle C when the user uses the available service is stored. The detailed information of the relay-related information, for example, may be stored as object data of an XML format file, and for example, may be defined by the management item (the field) exemplified in FIG. 4. A sub-management item, for example, includes a communication traffic volume (an actual measurement value), a buffer retention volume (an actual measurement value), and quality information (an actual measurement value) of each port. In the communication traffic volume (the actual measurement value) of each of the ports, an actual measurement value of a communication traffic volume included in the relay-related information transmitted from the vehicle C is stored. The actual measurement value of the communication traffic volume includes an actual measurement value in each of the vehicle interior communication units 32 (each of the ports) of each of the relay devices 3. In the buffer retention volume (the actual measurement value), an actual measurement value of a buffer retention volume included in the relay-related information transmitted from the vehicle C is stored. The actual measurement value of the buffer retention volume includes an actual measurement value in each of the vehicle interior communication units 32 of each of the relay devices 3. In the quality information (the actual measurement value), an actual measurement value of quality information included in the relay-related information transmitted from the vehicle C is stored. The actual measurement value of the quality information includes an actual measurement value in each of the vehicle interior communication units 32 of each of the relay devices 3.

In the NW setting information, network setting information that has been applied to the relay device 3 of the vehicle C when the user uses the available service is stored. The network setting information includes information relevant to the in-vehicle ECU 4, such as a service provision ECU and a service request ECU, which are required when using the available service, and information relevant to a communication route from the service provision ECU to the service request ECU, and for example, may be stored as the object data of the XML format file. The vehicle exterior server 100 may constantly, periodically, or stationarily acquire (receive) the history information of the available service that has been used in the vehicle C from each of the plurality of vehicles C to which the vehicle exterior server is connected such that communication is available to update the available service history table. The network setting information may further include an access control list (ACL) and quality of service (QoS), in addition to an address resolution logic table (ARL) such as the information relevant to the communication route.

FIG. 5 is an explanatory diagram illustrating an example of a network setting information table (the communication route). For the network setting information that is transmitted to the vehicle exterior server 100 from each of the plurality of vehicles C connected to the vehicle exterior server 100 such that communication is available and is aggregated in the vehicle exterior server 100, for example, the information relevant to the communication route is decompressed for each vehicle C (for each vehicle model), and is stored in the storage unit 101 of the vehicle exterior server 100, as the network setting information table in a table format.

The network setting information table includes the user ID, the available service name, the provision ECU, and the request ECU, as the management item (the field) of the table, and for example, a communication route of a vehicle CX, a communication route of a vehicle CY, and a communication route of a vehicle CZ, as the communication route (the network setting information) for each vehicle C.

In the management item (the field) of the user ID, the identification number (the user ID) for identifying the user using the available service in the vehicle C is stored and associated (related) with the available service history table. In the available service name, the name or the type of available service is stored.

In the provision ECU, information such as a specification model or a model number relevant to the in-vehicle ECU 4 (the service provision ECU) that is required to provide the service when using the available services stored in the same record is stored. In the request ECU, information such as a specification model or a model number relevant to the in-vehicle ECU 4 (the service request ECU) that is required to request the service when using the available services stored in the same record is stored.

In the management item (the field) of the communication route for each vehicle C, in each of the vehicles C, the information relevant to the communication route from the provision ECU to the request ECU in the in-vehicle network 5 when using the available services stored in the same record is stored. For example, in the management item (the field) of the communication route of the vehicle C(X), information relevant to the communication route corresponding to each of the available services that can be applied to the vehicle C(X) is stored. In addition, from the viewpoint of a specific available service, for example, in an available service (A), an ECU 41 and an ECU 43 are required as the provision ECU and the request ECU, and the available service (A) can be applied to the vehicle C(X) and the vehicle C(Y) including the ECU 41 and the ECU 43. In the vehicle C(Z), for example, the available service (A) is not available due to an insufficient bandwidth in the in-vehicle network 5. In addition, an available service (C) can be applied to the vehicle C(X), but is not capable of being applied to the vehicle C(Y) and the vehicle C(Z) since the vehicle C(Y) and the vehicle C(Z) do not include both of the provision ECU and the request ECU.

For each of the available services, information relevant to the availability of application (transfer) is stored in the network setting information table, in accordance with each of the vehicles C (vehicle models), and thus, the vehicle exterior server 100 is capable of efficiently determining the application availability (the transfer availability) of each of the available services with respect to each of the vehicles C (vehicle models), with reference to the network setting information table.

In the management item (the field) of the communication route for each vehicle C, a communication route according to the in-vehicle network 5 of each of the vehicles C is stored. Accordingly, for example, when the available service (A) used in the vehicle C(X) is transferred to the vehicle C(Y), the vehicle exterior server 100 is capable of converting the network setting information of the vehicle C(X) that is an inheritance source, on the basis of a difference in the communication routes between the vehicles C, and generating the network setting information of the vehicle C(Y). In this case, the network setting information of the vehicle C(X) that is an inheritance source corresponds to inheritance source network setting information. The network setting information of the vehicle C(Y) that is an inheritance destination corresponds to network setting information after conversion.

Figure 6:
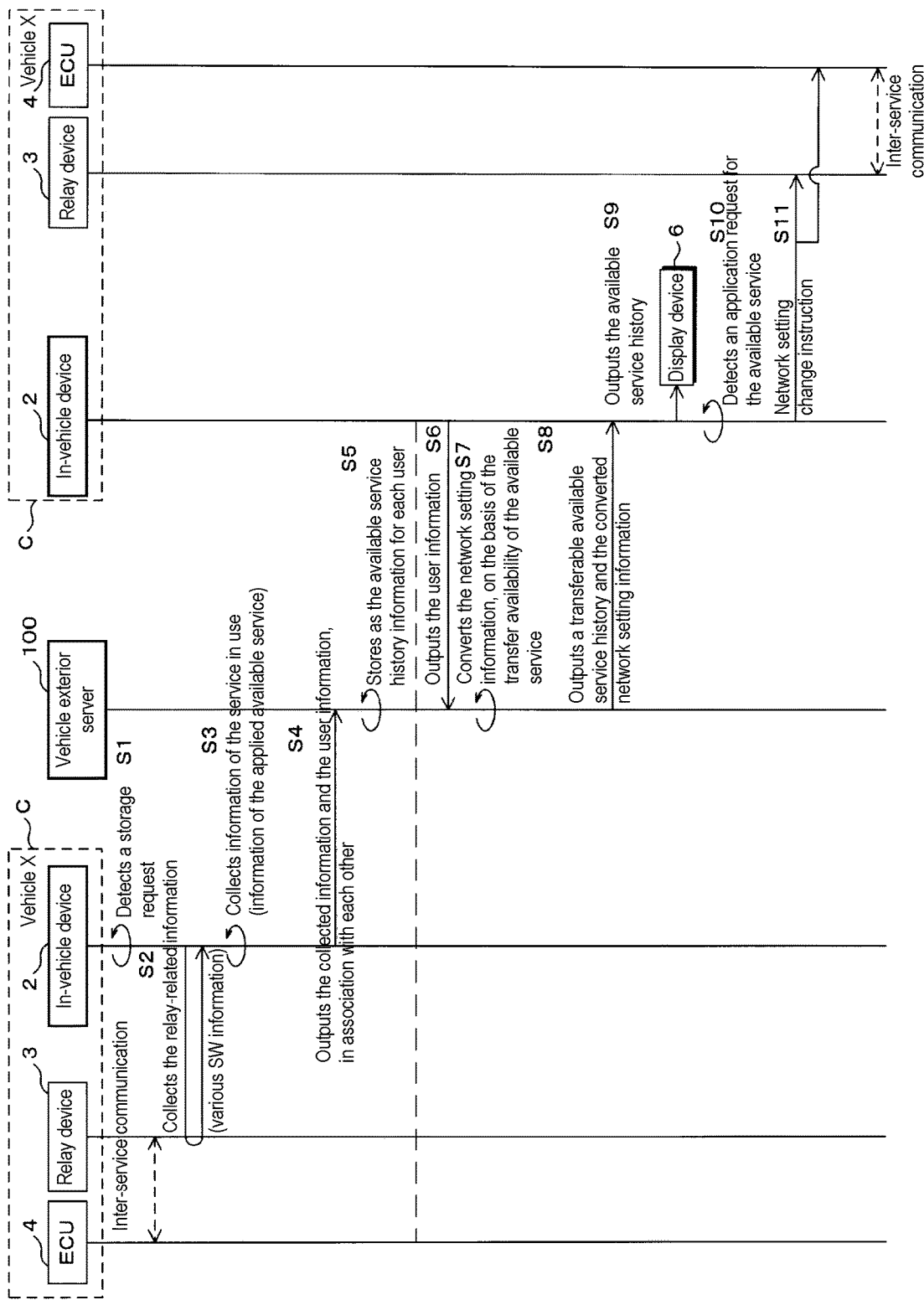

FIG. 6 is an explanatory diagram (a sequence diagram) exemplifying one aspect of each processing piece of the in-vehicle device 2 and the like. Association processing between the relay device 3 and the in-vehicle device 2 in each of the plurality of vehicles C included in the in-vehicle system S, and the vehicle exterior server 100 will be described by using the illustrated sequence diagram in this embodiment. In the sequence diagram, in the communication with the vehicle C(X) and vehicle C(Y), the vehicle exterior server 100 does not simultaneously communicate with the vehicle C(X) and the vehicle C(Y), and may communicate with any of the vehicles C for which the user authentification (the login) is performed by the user.

The relay device 3 and the in-vehicle ECU 4 perform the relay processing and the inter-service communication, on the basis of the network setting information applied to the relay device 3. The network setting information applied to the relay device 3 corresponds to the available service used in the vehicle C, is generated by the in-vehicle device 2, and is according to the network setting change instruction output (transmitted) to the relay device 3.

The in-vehicle device 2 of the vehicle C(X) detects a storage request of the user (S1). The in-vehicle device 2 of the vehicle C(X), for example, receives the manipulation of the user on the display device 6 having a touch panel function, and detects the storage request that is performed on the basis of the manipulation.

The in-vehicle device 2 of the vehicle C(X) collects the relay-related information output from the relay device 3 (S2). The in-vehicle device 2 of the vehicle C(X) requests the collection of the relay-related information to each of the relay devices 3 mounted on the own vehicle, and acquires the relay-related information transmitted from the relay-related information, and thus, collects the relay-related information output from the plurality of relay devices 3.

The in-vehicle device 2 of the vehicle C(X) collects information of the service in use used in the own vehicle (S3). The in-vehicle device 2 of the vehicle C(X), for example, acquires information of the available service (the information of the service in use) specified on the basis of the usage pattern (the usage scene) of the vehicle C, such as an autonomous driving state and a car-sharing state. Such information of the service in use, for example, is stored in the storage unit 21 of the in-vehicle device 2.

The in-vehicle device 2 of the vehicle C(X) outputs the collected information (the relay-related information and the information of the service in use) and the user information to the vehicle exterior server 100, in association with each other (S4). The user information associated with the collected information (the relay-related information and the information of the service in use), for example, may include the user ID for identifying the user, and the vehicle model information for specifying the vehicle model or the like of the own vehicle.

The vehicle exterior server 100 stores the information (the relay-related information and the information of the service in use) acquired (received) from the in-vehicle device 2 of the vehicle C(X), and the user information, as the available service history information for each user (S5). The vehicle exterior server 100, for example, updates the available service history table and the network setting information table, on the basis of the information (the relay-related information and the information of the service in use) acquired from the vehicle C(X), and the user information. As illustrated (a dotted line between S5 and S6) in this embodiment, the user in the vehicle C(X) ends (logs out) the use of the service.

The in-vehicle device 2 of the vehicle C(Y) outputs the user information of the vehicle C to the vehicle exterior server 100 (S6). The in-vehicle device 2 of the vehicle C(Y), for example, outputs the user ID in the user authentification to the vehicle exterior server 100, as the user information. The user information may include the vehicle model information of the vehicle C that is used by the user, in addition to the user ID.

The vehicle exterior server 100 converts the network setting information, on the basis of the transfer availability of the available service (S7). The vehicle exterior server 100 converts the network setting information, with reference to the user information (the user ID, the vehicle model information, and the like), on the basis of the transfer availability of the available service, and the available service history information table and the network setting information table stored in the storage unit 101 of the vehicle exterior server 100. In the network setting information table, the information (the vehicle model information) of the vehicle C that can be applied to each of the available services is stored, and thus, the vehicle exterior server 100 is capable of determining the transfer availability of the available service, with reference to the network setting information table.

The vehicle exterior server 100 outputs a transferable available service history and the converted network setting information to the in-vehicle device 2 of the vehicle C(Y) (S8). The network setting information output (transmitted) to the in-vehicle device 2 of the vehicle C(Y) from the vehicle exterior server 100 corresponds to the inheritance source network setting information in the vehicle C(Y).

The in-vehicle device 2 of the vehicle C(Y) outputs the available service history to the display device 6 (S9). The in-vehicle device 2 of the vehicle C(Y) outputs the transferable available service history acquired from the vehicle exterior server 100 to the display device 6, and displays the transferable available service history, for example, on the display device 6 in a list format.

The in-vehicle device 2 of the vehicle C(Y) detects an application request (a load request) for the available service (S10). The in-vehicle device 2 of the vehicle C(Y), for example, receives the manipulation of the user on the display device 6 having the touch panel function, and detects the application request (the load request) that is performed on the basis of the manipulation.

The in-vehicle device 2 of the vehicle C(Y) outputs the network setting change instruction generated on the basis of the network setting information corresponding to the available service selected in the request of the user (S11). The in-vehicle device 2 of the vehicle C(Y) generates the network setting change instruction, on the basis of the network setting information corresponding to the selected available service name (the inheritance source network setting information acquired from the vehicle exterior server 100). The in-vehicle device 2 of the vehicle C(Y) outputs (transmits) the generated network setting change instruction to each of the relay devices 3 and the in-vehicle ECUs 4.

The relay device 3 and the in-vehicle ECU 4 that have acquired (received) the network setting change instruction from the in-vehicle device 2 perform the relay processing and the inter-service communication corresponding to the vehicle state after switch (the available service/usage scene), on the basis of the network setting information included in the network setting change instruction. Accordingly, an available service corresponding to the inheritance source network setting information can be transferred (inherited) to the vehicle C(Y), on the basis of the inheritance source network setting information acquired from the vehicle exterior server 100. Even in a case where, for example, there is a difference in the route configuration of the in-vehicle network 5 between the vehicle C that is an inheritance source and the vehicle C that is an inheritance destination, the inheritance source network setting information is converted by the vehicle exterior server 100, and thus, the difference is absorbed, and the inheritance source network setting information can be applied (transferred) to the vehicle C that is an inheritance destination.

Figure 7:
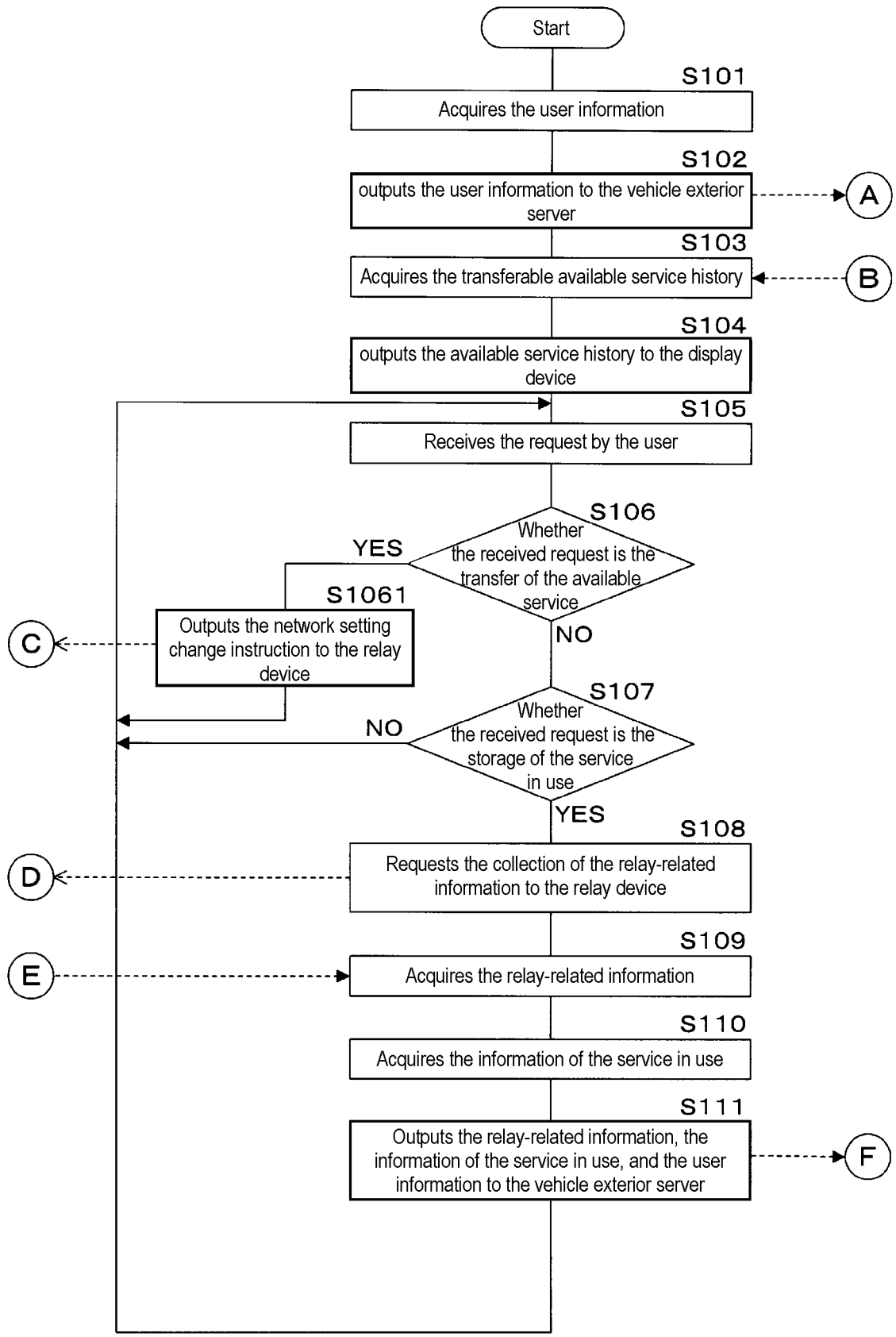
FIG. 7 is a flowchart exemplifying processing of a control unit of the in-vehicle device.
Figure 8:
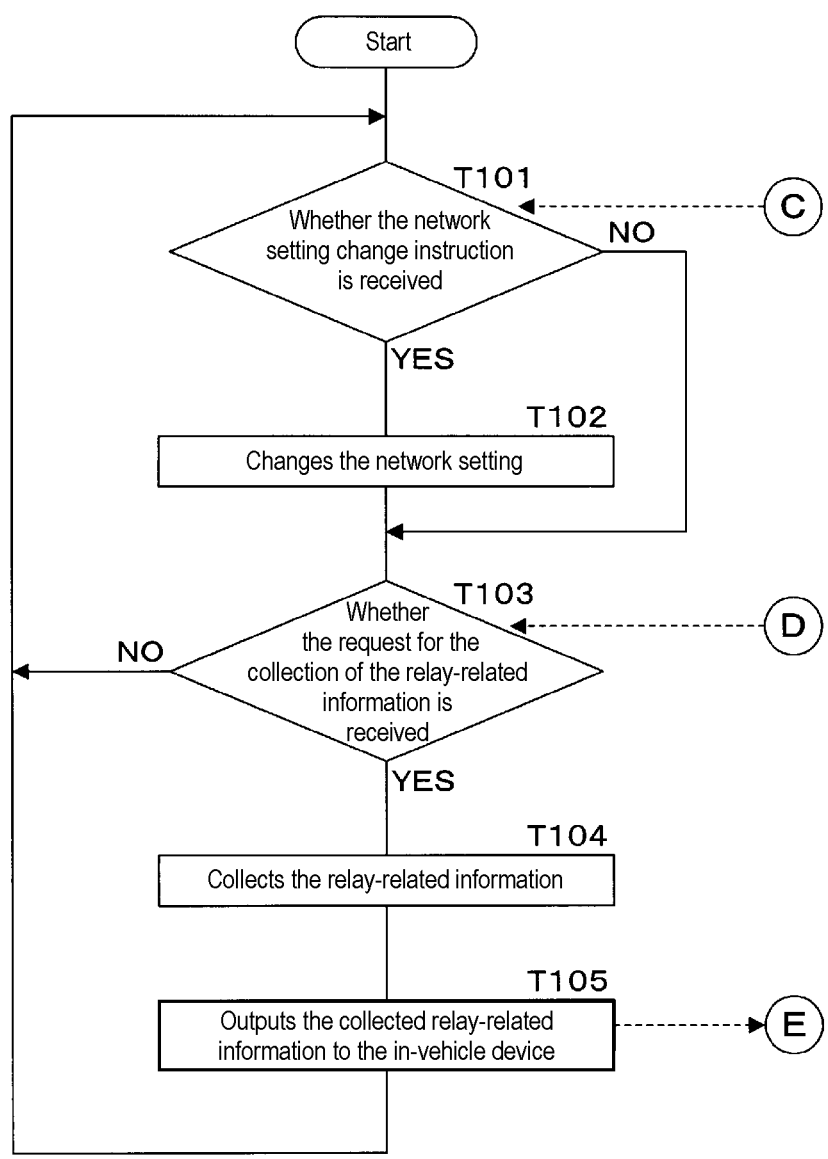
FIG. 8 is a flowchart exemplifying processing of a control unit of a relay device.
Figure 9:
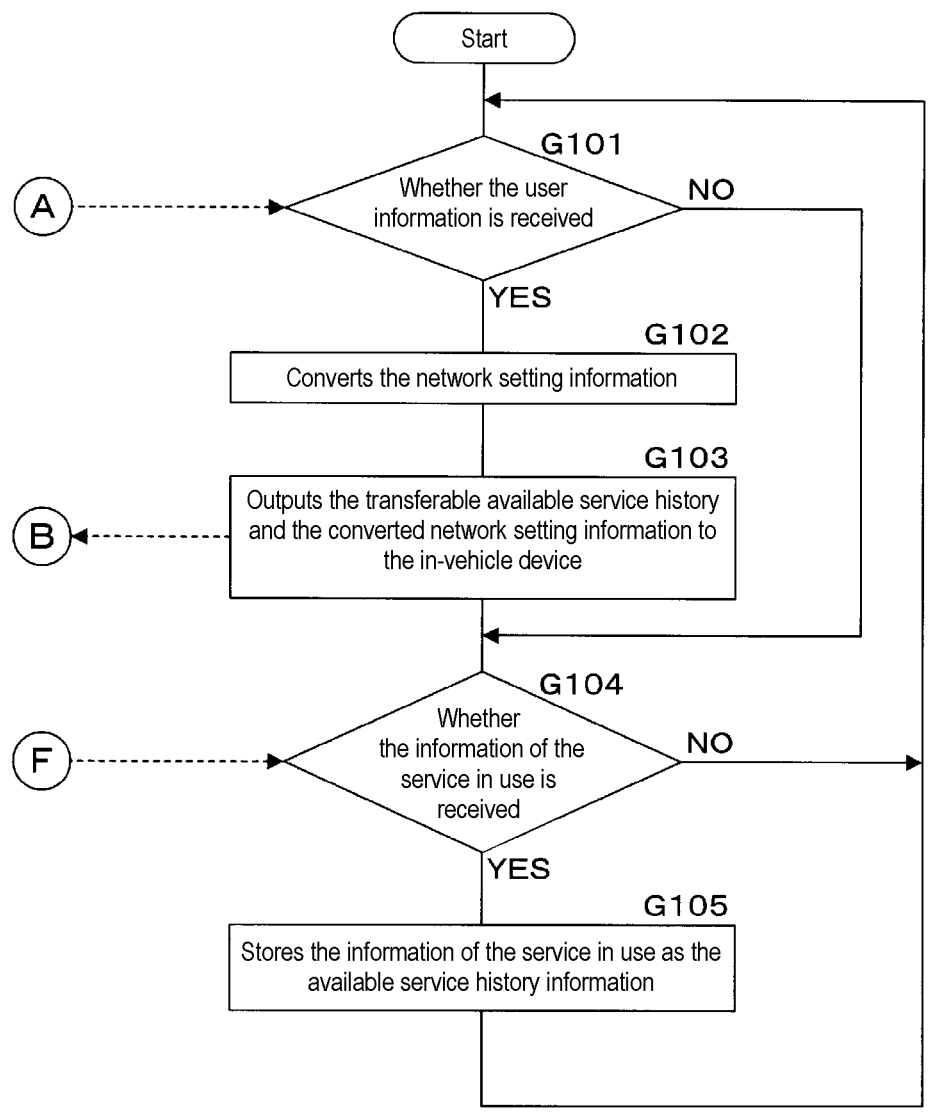
FIG. 9 is a flowchart exemplifying processing of a control unit of a vehicle exterior server.

FIG. 7 is a flowchart exemplifying the processing of the control unit 20 of the in-vehicle device 2. FIG. 8 is a flowchart exemplifying the processing of the control unit 30 of the relay device 3. FIG. 9 is a flowchart exemplifying the processing of the control unit 102 of the vehicle exterior server 100. The control unit 20 of the in-vehicle device 2, for example, stationarily performs the following processing when the vehicle C is in a start state (the IG switch is turned on) or a stop state (the IG switch is turned off). When the control unit 20 of the in-vehicle device 2 performs the following processing, the relay device 3 and the vehicle exterior server 100 communicate with the in-vehicle device 2, and perform the following processing, in association with the processing of the in-vehicle device 2.

The control unit 20 of the in-vehicle device 2 acquires the user information of the vehicle C (S101). The control unit 20 of the in-vehicle device 2, for example, acquires the user information of the user, on the basis of the result of the user authentification that is performed by the user of the vehicle C. The control unit 20 of the in-vehicle device 2, for example, may output an application screen for performing the user authentification to the display device 6, and may perform the user authentification, on the basis of the contents input by the user using the touch panel function of the display device 6. In a case where a user authentification result is positive, the control unit 20 of the in-vehicle device 2 may specify and acquire the user information, on the basis of the contents input by the user. The control unit 20 of the in-vehicle device 2 may perform processing relevant to initialization, together with the user authentification.

The control unit 20 of the in-vehicle device 2 outputs the user information to the vehicle exterior server 100 (S102). The control unit 20 of the in-vehicle device 2, for example, outputs the user ID used in the user authentification to the vehicle exterior server 100, as the user information (the transmission and reception between the in-vehicle device 2 and the vehicle exterior server 100: A). When the user information including the user ID is output to the vehicle exterior server 100, the control unit 20 of the in-vehicle device 2 may output the user information to the vehicle exterior server 100 by including the information (the vehicle model information) relevant to the type of the vehicle C (the own vehicle). In this case, the user information output (transmitted) to the vehicle exterior server 100 includes the user ID (the user identification number) for uniquely identifying the user, and the vehicle model information of the vehicle C that is used by the user. The user information may include the identification number (the vehicle identification number: VIN), instead of the vehicle model information or together with the vehicle model information.

The control unit 20 of the in-vehicle device 2 acquires the transferable available service history and the network setting information from the vehicle exterior server 100 (S103). The output of the transferable available service history and the network setting information to the in-vehicle device 2 from the vehicle exterior server 100 (the transmission and reception between vehicle exterior server 100 and the in-vehicle device 2: B) is performed by the processing of G103 in a processing flow of the vehicle exterior server 100 described below. The network setting information acquired from the vehicle exterior server 100 corresponds to the inheritance source network setting information to be inherited to the relay device 3 that is mounted on the own vehicle (the vehicle C on which the in-vehicle device 2 is mounted). That is, the control unit 20 of the in-vehicle device 2 acquires the network setting information to be inherited to the relay device 3 when using the available service, as the inheritance source network setting information, together with the transferable available service history.

The control unit 20 of the in-vehicle device 2 outputs the available service history to the display device 6 (S104). The control unit 20 of the in-vehicle device 2 outputs the transferable available service history acquired from the vehicle exterior server 100 to the display device 6, and the display device 6 displays the transferable available service history, for example, in a list format. The list, for example, includes the available service name in the transferable available service history, the outline of the available service, and the date and time when the available service is used.

The control unit 20 of the in-vehicle device 2 receives the request by the user of the vehicle C (S105). The control unit 20 of the in-vehicle device 2, for example, receives the request of the user, in accordance with the manipulation of the user according to the touch panel function provided in the display device 6. The request includes a request relevant to the transfer (the load) of the available service and a request relevant to the storage of the service in use.

The control unit 20 of the in-vehicle device 2 determines whether the received request is the transfer of the available service (S106). In a case where the request of the user is the transfer of the available service (S106: YES), the control unit 20 of the in-vehicle device 2 outputs the network setting change instruction generated on the basis of the network setting information corresponding to the available service selected in the request of the user (S1061). The control unit 20 of the in-vehicle device 2, for example, receives the selection of one or more available service names, among the available service name (the transferable available service history) displayed on the display device 6 in a list format. The control unit 20 of the in-vehicle device 2 generates the network setting change instruction, on the basis of the network setting information corresponding to the selected available service name (the inheritance source network setting information acquired from the vehicle exterior server 100). The control unit 20 of the in-vehicle device 2 outputs (transmits) the generated network setting change instruction to each of the relay devices 3 (the transmission and reception between the relay device 3 and the in-vehicle device 2: C).

In a case where the request of the user is not the transfer of the available service (S106: NO), the control unit 20 of the in-vehicle device 2 determines whether the received request is the storage of the service in use (S107). In a case where the request of the user is the storage of the service being used (the service in use) (S107: YES), the control unit 20 of the in-vehicle device 2 requests the collection of the relay-related information to the relay device 3 (S108). The control unit 20 of the in-vehicle device 2 requests the collection (the acquisition) of the relay-related information to each of the relay devices 3 (the transmission and reception between the relay device 3 and the in-vehicle device 2: D).

The control unit 20 of the in-vehicle device 2 acquires the relay-related information from the relay device 3 (S109) (the transmission and reception between the relay device 3 and the in-vehicle device 2: E). The relay-related information, for example, may include the network setting information of the relay device 3 that is applied at the current time point, error information such as a packet loss and buffer overflow for each vehicle interior communication unit 32 of the relay device 3, and communication quality information based on a queue buffer retention volume, the communication traffic volume, the number of times of retransmission or congestion occurrence, and the like.

The control unit 20 of the in-vehicle device 2 acquires the information of the service in use (information of the applied available service) (S110). The control unit 20 of the in-vehicle device 2, for example, acquires the information of the available service (the information of the service in use) that is specified on the basis of the usage pattern (the usage scene) of the vehicle C, such as an autonomous driving state and a car-sharing state. The available service is the applied available service (the service in use) in the own vehicle. The information of the service in use, for example, is stored in the storage unit 21 of the in-vehicle device 2, and with reference to the information, the control unit 20 of the in-vehicle device 2 acquires the information of the service in use.

The control unit 20 of the in-vehicle device 2 outputs the relay-related information, the information of the service in use, and the user information to the vehicle exterior server 100 (S111). The control unit 20 of the in-vehicle device 2 outputs the acquired relay-related information, information of the service in use, and user information to the vehicle exterior server 100 (the transmission and reception between the vehicle exterior server 100 and the in-vehicle device 2: F).

In a case where the request of the user is not the storage of the service being used (the service in use) (S107: NO), the processing of S1061 or S111 is executed, and then, the control unit 20 of the in-vehicle device 2 performs loop processing to execute again S105.

The control unit 30 of the relay device 3 determines whether the network setting change instruction is received from the in-vehicle device 2 (T101). The output of the network setting change instruction to the relay device 3 from the in-vehicle device 2 (the transmission and reception between the relay device 3 and the in-vehicle device 2: C) is performed by the processing of S1061 in the in-vehicle device 2.

In a case where the network setting change instruction is received (T101: YES), the control unit 30 of the relay device 3 changes the network setting (T102). The control unit 30 of the relay device 3, for example, overwrites and stores the network setting information stored in the storage unit 31 of the relay device 3, on the basis of the network setting change instruction received (acquired) from the in-vehicle device 2, to change the network setting.

In a case where the network setting change instruction is not received (T101: NO), or after the processing of T102 is executed, the control unit 30 of the relay device 3 determines whether the request for the collection of the relay-related information is received from the in-vehicle device 2 (T103). The output of the request for the collection of the relay-related information to the relay device 3 from the in-vehicle device 2 (the transmission and reception between the relay device 3 and the in-vehicle device 2: D) is performed by the processing of S108 in the in-vehicle device 2.

In a case where the request is received (T103: YES), the control unit 30 of the relay device 3 collects the relay-related information (T104). The control unit 30 of the relay device 3, for example, collects relay log data stored in the storage unit 31 of the relay device 3, the network setting information that is applied at the current time point, and a communication amount that is greater than a threshold value. The relay log data, for example, may include the error information such as a packet loss and buffer overflow for each vehicle interior communication unit 32 of the relay device 3, the communication quality information based on the queue buffer retention volume, the communication traffic volume, the number of times of retransmission or congestion occurrence, and the like. When the communication amount is collected, the control unit 30 of the relay device 3 may calculate statistical information, on the basis of the collected communication amount, to include the statistical information in the communication amount.

The control unit 30 of the relay device 3 outputs the collected relay-related information to the in-vehicle device 2 (T105). The control unit 30 of the relay device 3 outputs the relay-related information collected on the basis of the request from the in-vehicle device 2 to the in-vehicle device 2 (the transmission and reception between the relay device 3 and the in-vehicle device 2: E).

In a case where the request is not received (T103: NO), or after the processing of T105 is executed, the control unit 30 of the relay device 3 performs the loop processing to execute again the processing of T101.

The control unit 102 of the vehicle exterior server 100 determines whether the user information is received from the in-vehicle device 2 (G101). The output of the user information to the vehicle exterior server 100 from the in-vehicle device 2 (the transmission and reception between the in-vehicle device 2 and the vehicle exterior server 100: A) is performed by the processing of S102 in the processing flow of the in-vehicle device 2.

In a case where the user information is received from the in-vehicle device 2 (G101: YES), the control unit 102 of the vehicle exterior server 100 converts the network setting information, on the basis of the transfer availability of the available service (G102). The control unit 102 of the vehicle exterior server 100 converts the network setting information, with reference to the user information (the user ID, the vehicle model information, and the like) acquired from the in-vehicle device 2, and the available service history information table and the network setting information table stored in the storage unit 101 of the vehicle exterior server 100. The control unit 102 of the vehicle exterior server 100, for example, extracts the available service that can be used by the vehicle C specified by the vehicle model information, with reference to the network setting information table, on the basis of the vehicle model information included in the user information.

In the network setting information table, the information (the vehicle model information) of the vehicle C that can be applied to each of the available services is stored. Accordingly, the control unit 102 of the vehicle exterior server 100 compares the vehicle model information included in the user information with the available service previously used by the user, and thus, is capable of extracting an available service (a transferable available service) that can be currently applied in the vehicle C (the own vehicle). The control unit 102 of the vehicle exterior server 100 specifies the network setting information corresponding to the transferable available service, as the inheritance source network setting information, and converts the specified inheritance source network setting information to be suited to the vehicle C (the own vehicle) that is an inheritance destination.

The conversion of the inheritance source network setting information, for example, may be performed by converting the communication route, on the basis of a difference between the communication route in the in-vehicle network 5 of the vehicle C that is an inheritance source and the communication route in the in-vehicle network 5 of the vehicle C (the own vehicle) that is an inheritance destination. In a case where the communication route in the in-vehicle network 5 of the vehicle C that is an inheritance source and the communication route in the in-vehicle network 5 of the vehicle C (the own vehicle) that is an inheritance destination are the same or have compatibility, the conversion of the inheritance source network setting information is not required. In this case, the control unit 102 of the vehicle exterior server 100 may output the inheritance source network setting information to the in-vehicle device 2 without converting the inheritance source network setting information. An available service (an untransferable available service) that is not capable of being currently applied in the vehicle C (the own vehicle), for example, may be specified by the in-vehicle ECU 4 (the service provision ECU and the service request ECU) required for using the available service not being mounted on the vehicle C (the own vehicle). The control unit 102 of the vehicle exterior server 100 is capable of efficiently performing the transfer availability of the available service and the conversion of the inheritance source network setting information in a case where the available service can be transferred, with reference to the network setting information table and the like.

The control unit 102 of the vehicle exterior server 100 outputs the transferable available service history and the converted network setting information to the in-vehicle device 2 (G103). The control unit 102 of the vehicle exterior server 100 outputs the transferable available service history and the converted network setting information, that is, the network setting information (the inheritance source network setting information) converted in accordance with the available service that can be applied in the vehicle C to which the user information is output, the communication route in the vehicle C for using the available service, and the like, to the in-vehicle device 2 of the vehicle C (the transmission and reception between the vehicle exterior server 100 and the in-vehicle device 2: B).

In a case where the user information is not received from the in-vehicle device 2 (G101: NO), or after the processing of G103 is executed, the control unit 102 of the vehicle exterior server 100 determines whether the network setting information, the information of the service in use, and the user information are received from the in-vehicle device 2 (G104). The output of the information of the service in use and the like to the vehicle exterior server 100 from the in-vehicle device 2 (the transmission and reception between the in-vehicle device 2 and the vehicle exterior server 100: F) is performed by the processing of S111 in the processing flow of the in-vehicle device 2.

In a case where the information of the service in use and the like are received from the in-vehicle device 2 (G104: YES), the control unit 102 of the vehicle exterior server 100 stores the information of the service in use and the like that are received from the in-vehicle device 2, as the available service history information (G105). The control unit 102 of the vehicle exterior server 100 acquires the relay-related information, the information of the service in use, and the user information that are received from the in-vehicle device 2, stores the acquired information in the storage unit 101 of the vehicle exterior server 100, and updates the available service history table and the network setting information table.

In a case where the information of the service in use and the like are not received from the in-vehicle device 2 (G104: NO), or after the processing of G105 is executed, the control unit 102 of the vehicle exterior server 100 performs the loop processing to execute again the processing of G101.

Figure 10:
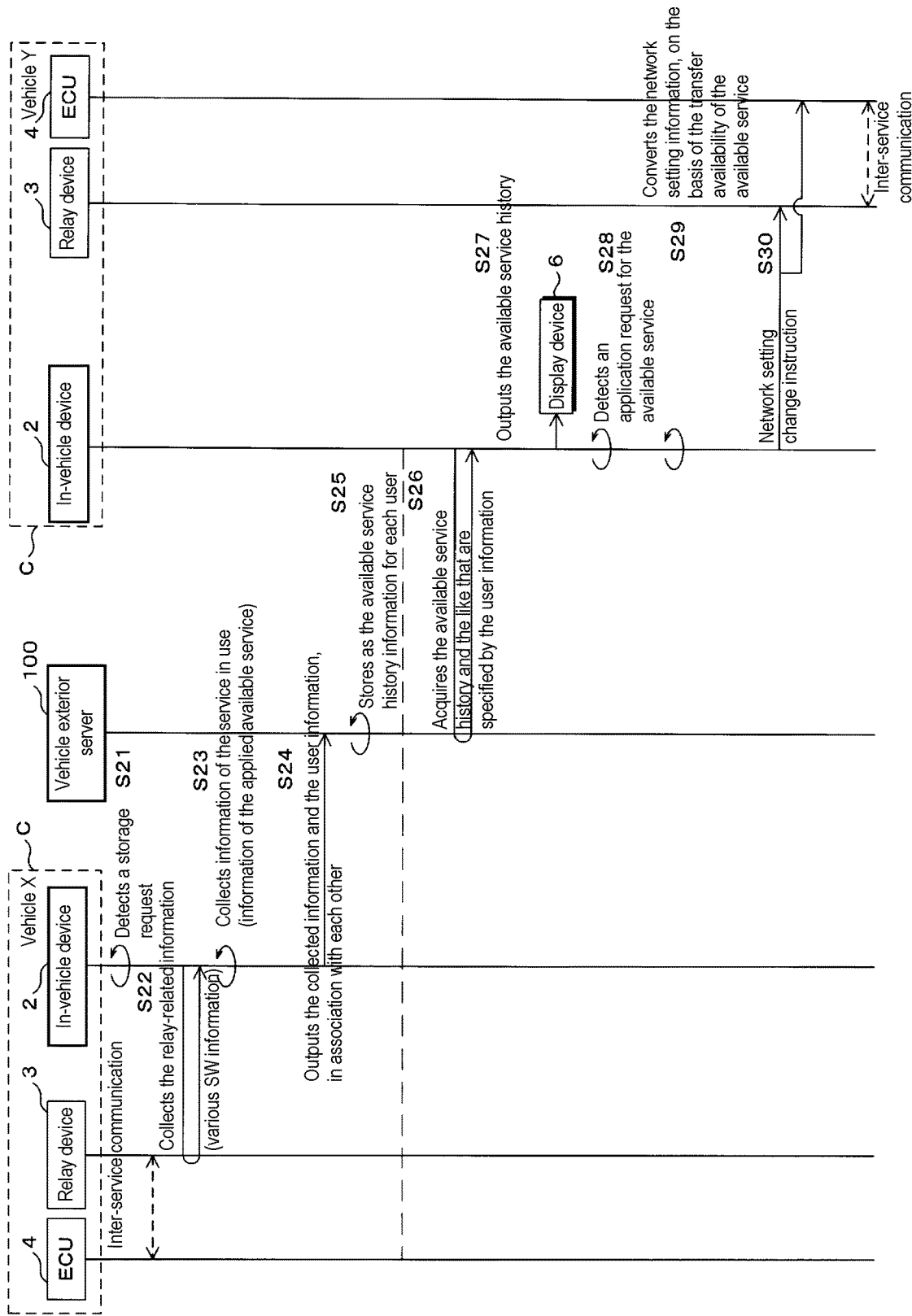
FIG. 10 is an explanatory diagram (a sequence diagram) exemplifying one aspect of each processing piece of an in-vehicle device and the like according to Embodiment 2.

FIG. 10 is an explanatory diagram (a sequence diagram) exemplifying one aspect of each processing piece of the in-vehicle device 2 and the like according to Embodiment 2. In the in-vehicle system S including the in-vehicle device 2 and the like according to Embodiment 2, the change of the network setting information that is performed when the available service is transferred between different vehicles C is performed by the in-vehicle device 2 of the vehicle C that is a transfer destination. The storage unit 21 of the in-vehicle device 2 stores the same table (the network setting information table) as the network setting information table stored in the storage unit 101 of the vehicle exterior server 100 of Embodiment 1. The control unit 20 of the in-vehicle device 2 converts the network setting information (the inheritance source network setting information) to be suited to the own vehicle, with reference to the network setting information table stored in the storage unit of the own device. As with Embodiment 1, the relay device 3 and the in-vehicle ECU 4 perform the relay processing and the inter-service communication, on the basis of the network setting information applied to the relay device 3.

The in-vehicle device 2 of the vehicle C(X) detects the storage request of the user (S21). The in-vehicle device 2 of the vehicle C(X) collects the relay-related information output from the relay device 3 (S22). The in-vehicle device 2 of the vehicle C(X) collects the information of the service in use that is used in the own vehicle (S23). The in-vehicle device 2 of the vehicle C(X) outputs the collected information (the relay-related information and the information of the service in use) and the user information to the vehicle exterior server 100, in association with each other (S24). As with the processing of S1 to S4 in Embodiment 1, the in-vehicle device 2 of the vehicle C(X) performs the processing of S21 to S24.

The vehicle exterior server 100 stores the information (the relay-related information and the information of the service in use) acquired (received) from the in-vehicle device 2 of the vehicle C(X) and the user information, as the available service history information for each user (S25). As with the processing of S5 in Embodiment 1, the vehicle exterior server 100 performs the processing of S25. As illustrated (a dotted line between S25 and S26) in this embodiment, the user in the vehicle C(X) ends (logs out) the use of the service.

The in-vehicle device 2 of the vehicle C(Y) acquires the available service history and the like that are specified by the user information from the vehicle exterior server 100 (S26). The in-vehicle device 2 of the vehicle C(Y) acquires the available service history of the user that is specified by the user information, and the network setting information corresponding to each of the available services from the vehicle exterior server 100. The network setting information acquired from the vehicle exterior server 100 corresponds to the inheritance source network setting information in the vehicle C(Y). The in-vehicle device 2 of the vehicle C(Y) may acquire only the available service history (the relay-related information) of the user that is specified by the user information. In this case, the in-vehicle device 2 of the vehicle C(Y) may create (initialize) the network setting information for the own vehicle, in accordance with a service identifier for specifying the configuration of the in-vehicle ECU 4 and the like mounted on the own vehicle and the type of available service.

The in-vehicle device 2 of the vehicle C(Y) outputs the available service history to the display device 6 (S27). The in-vehicle device 2 of the vehicle C(Y) outputs the available service history acquired from the vehicle exterior server 100 to the display device 6, and displays the transferable available service history, for example, on the display device 6 in a list format.

The in-vehicle device 2 of the vehicle C(Y) detects the application request (the load request) for the available service (S28). As with the processing of S10 in Embodiment 1, the in-vehicle device 2 of the vehicle C(Y), for example, receives the manipulation of the user on the display device 6 having the touch panel function, and detects the application request (the load request) performed on the basis of the manipulation.

The in-vehicle device 2 of the vehicle C(Y) converts the network setting information, on the basis of the transfer availability of the available service (S29). The in-vehicle device 2 of the vehicle C(Y), for example, converts the network setting information, with reference to the network setting information table stored in the storage unit 21 of the in-vehicle device 2, on the basis of the available service history (the relay-related information) acquired from the vehicle exterior server 100. The in-vehicle device 2, for example, may extract the available service that can be used in the own vehicle, with reference to the network setting information table, on the basis of the vehicle model information of the own vehicle, and may output only the extracted available service (the available service that can be used in the own vehicle) to the display device 6 to execute the processing of S27 described above. Accordingly, an available service that is not capable of being used in the own vehicle (that is not capable of being transferred) is not displayed on the display device 6, and thus, it is possible to improve the user-friendliness of the user by selecting an available service to be transferred. Alternatively, the in-vehicle device 2 may display the available service that is not capable of being transferred (an uninheritable available service) and the available service that can be transferred (an inheritable available service) on the display device 6 in different display modes. In a vase where the network setting information (the inheritance source network setting information) is acquired from the vehicle exterior server 100, the in-vehicle device 2 of the vehicle C(Y) converts the inheritance source network setting information as described above. In a case where the network setting information for the own vehicle is created (initialized) in accordance with the service identifier for specifying the configuration of the in-vehicle ECU 4 and the like mounted on the own vehicle and the type of available service, the in-vehicle device 2 of the vehicle C(Y) may convert the created network setting information, on the basis of the available service history (the relay-related information) acquired from the vehicle exterior server 100.

The in-vehicle device 2 of the vehicle C(Y) outputs the network setting change instruction generated on the basis of the converted network setting information (S30). The in-vehicle device 2 of the vehicle C(Y) converts the network setting information corresponding to the selected available service name (the inheritance source network setting information acquired from the vehicle exterior server 100), and generates the network setting change instruction, on the basis of the converted network setting information.

Even in a case where, for example, there is a difference in the route configuration of the in-vehicle network 5 between the vehicle C that is an inheritance source and the vehicle C that is an inheritance destination, the inheritance source network setting information is converted by the in-vehicle device 2 of the vehicle C (the own vehicle) that is an inheritance destination, and thus, the difference is absorbed, and the inheritance source network setting information can be applied (transferred) to the vehicle C (the own vehicle) that is an inheritance destination.

Figure 11:
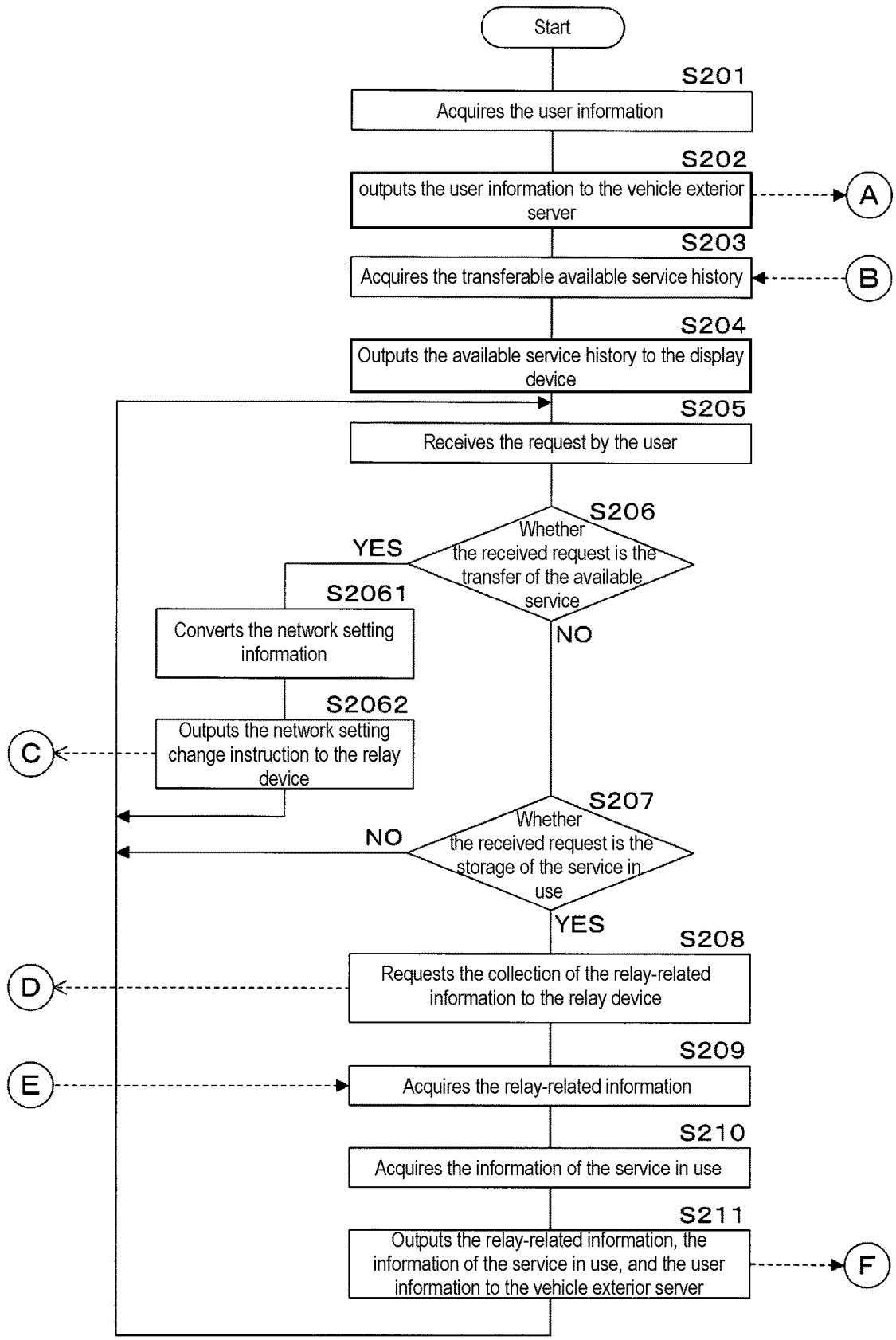
FIG. 11 is a flowchart exemplifying processing of a control unit of the in-vehicle device.
Figure 12:
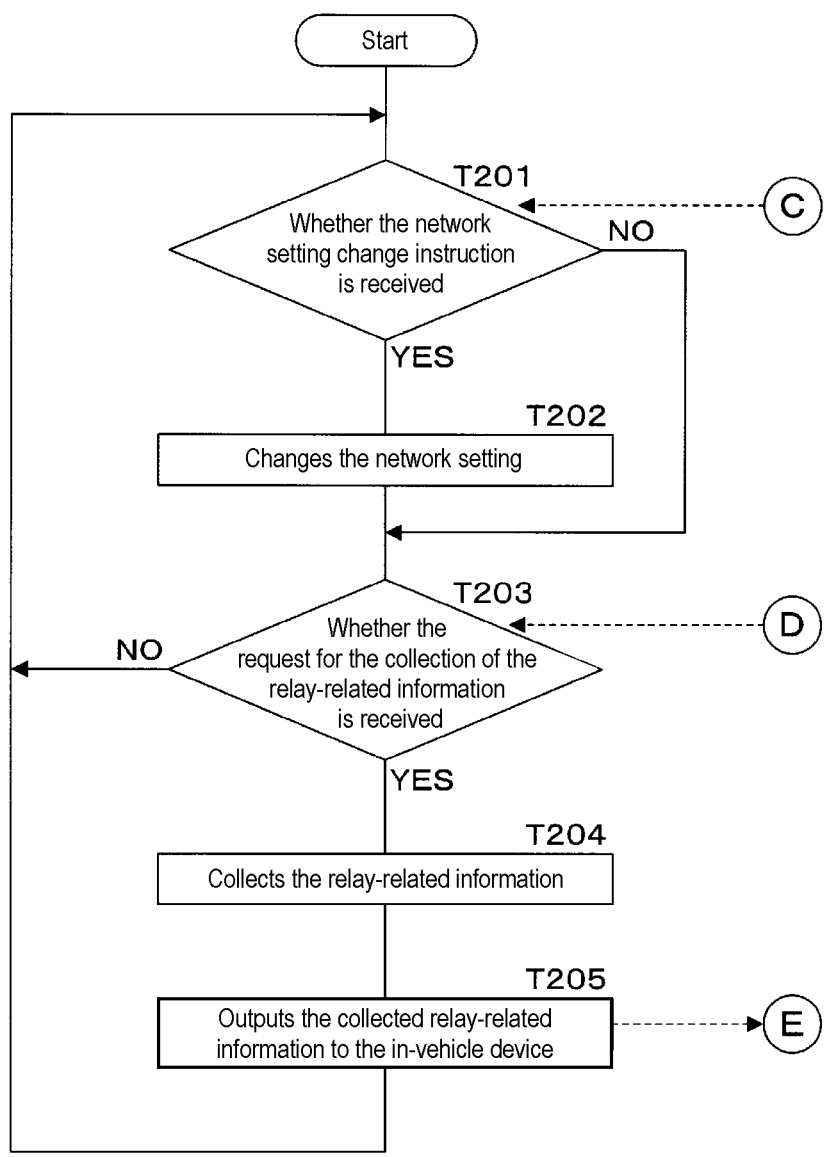
FIG. 12 is a flowchart exemplifying processing of a control unit of a relay device.
Figure 13:
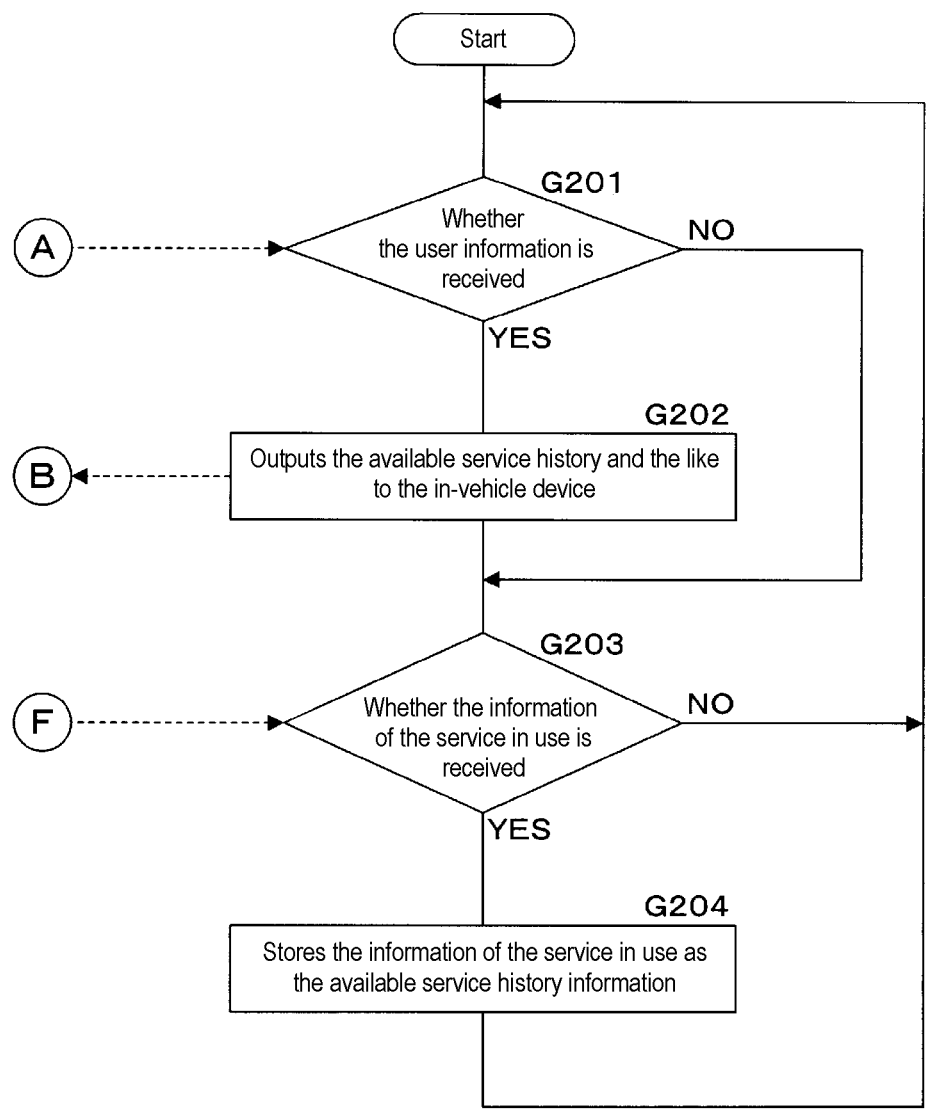
FIG. 13 is a flowchart exemplifying processing of a control unit of a vehicle exterior server.

FIG. 11 is a flowchart exemplifying the processing of the control unit 20 of the in-vehicle device 2. FIG. 12 is a flowchart exemplifying the processing of the control unit 30 of the relay device 3. FIG. 13 is a flowchart exemplifying the processing of the control unit 102 of the vehicle exterior server 100. As with Embodiment 1, for example, the control unit 20 of the in-vehicle device 2 stationarily performs the following processing when the vehicle C is in a start state (the IG switch is turned on) or a stop state (the IG switch is turned off). When the control unit 20 of the in-vehicle device 2 performs the following processing, the relay device 3 and the vehicle exterior server 100 communicate with the in-vehicle device 2, and perform the following processing, in association with the processing of the in-vehicle device 2.

The control unit 20 of the in-vehicle device 2 acquires the user information of the vehicle C (S201). The control unit 20 of the in-vehicle device 2 performs the processing of S201, as with S101 in Embodiment 1.

The control unit 20 of the in-vehicle device 2 outputs the user information to the vehicle exterior server 100 (S202). The control unit 20 of the in-vehicle device 2, for example, outputs the user ID that is used in the user authentification to the vehicle exterior server 100 as the user information (the transmission and reception between the in-vehicle device 2 and the vehicle exterior server 100: A). The control unit 20 of the in-vehicle device 2 outputs the user information to the vehicle exterior server 100, and thus, the transmission (the download) of the available service history that is specified by the user information (the user ID) is requested to the vehicle exterior server 100.

The control unit 20 of the in-vehicle device 2 acquires the available service history and the like from the vehicle exterior server 100 (S203). The control unit 20 of the in-vehicle device 2 acquires the available service history of the user that is specified by the user information, and the network setting information corresponding to each of the available services from the vehicle exterior server 100. The output of the transferable available service history and the network setting information to the in-vehicle device 2 from the vehicle exterior server 100 (the transmission and reception between the vehicle exterior server 100 and the in-vehicle device 2: B) is performed by the processing of G202 in the processing flow of the vehicle exterior server 100 described below. The available service history acquired from the vehicle exterior server 100 may include the available service that is not capable of being applied (transferred) in the vehicle C (the own vehicle) on which the in-vehicle device 2 is mounted. In addition, unlike Embodiment 1, the network setting information acquired from the vehicle exterior server 100 is not converted by the vehicle exterior server 100, that is, the network setting information used in the vehicle C that is an inheritance source. The network setting information is the original data that is converted by the control unit 20 of the in-vehicle device 2 in the subsequent processing, and corresponds to the inheritance source network setting information. The control unit 20 of the in-vehicle device 2 may acquire only the available service history (the relay-related information) of the user that is specified by the user information. In this case, the control unit 20 of the in-vehicle device 2 may create (initialize) the network setting information for the own vehicle, in accordance with the service identifier for specifying the configuration of the in-vehicle ECU 4 and the like mounted on the own vehicle and the type of available service.

The control unit 20 of the in-vehicle device 2 outputs the available service history to the display device 6 (S204). The control unit 20 of the in-vehicle device 2 outputs the available service history acquired from the vehicle exterior server 100 to the display device 6, and the display device 6 displays the transferable available service history, for example, in a list format. The list, for example, includes the available service name in the available service history, the outline of the available service, and the date and time when the available service is used.

The control unit 20 of the in-vehicle device 2 receives the request by the user of the vehicle C (S205). The control unit 20 of the in-vehicle device 2 performs the processing of S205, as with S105 in Embodiment 1.

The control unit 20 of the in-vehicle device 2 determines whether the received request is the transfer of the available service (S206). In a case where the request of the user is the transfer of the available service (S206: YES), the control unit 20 of the in-vehicle device 2 converts the network setting information, on the basis of the transfer availability of the available service (S2061). The control unit 20 of the in-vehicle device 2, for example, converts the network setting information, with reference to the network setting information table stored in the storage unit 21 of the in-vehicle device 2, or on the basis of the available service history (the relay-related information) acquired from the vehicle exterior server 100. The control unit 20 of the in-vehicle device 2, for example, extracts the available service that can be used in the own vehicle, with reference to network setting information table, on the basis of the vehicle model information of the own vehicle. In the network setting information table, the information (the vehicle model information) of the vehicle C that can be applied to each of the available services is stored. The control unit 20 of the in-vehicle device 2 compares the vehicle model information of the own vehicle with the available service that is previously used by the user, and thus, is capable of extracting the available service (the transferable available service) that can be currently applied in the vehicle C (the own vehicle). In a case where the network setting information (the inheritance source network setting information) is acquired from the vehicle exterior server 100, the control unit 20 of the in-vehicle device 2 converts the inheritance source network setting information, as described above. In a case where the network setting information for the own vehicle is created (initialized) in accordance with the service identifier for specifying the configuration of the in-vehicle ECU 4 and the like mounted on the own vehicle, and the type of available service, the control unit 20 of the in-vehicle device 2 may convert the created network setting information, on the basis of the available service history (the relay-related information) acquired from the vehicle exterior server 100.

The control unit 20 of the in-vehicle device 2 specifies the network setting information corresponding to the transferable available service, as the inheritance source network setting information, and converts the specified inheritance source network setting information to be suited to the vehicle C (the own vehicle) that is an inheritance destination. The conversion of the inheritance source network setting information, for example, may be performed by converting the communication route, on the basis of a difference between the communication route in the in-vehicle network 5 of the vehicle C that is an inheritance source and the communication route in the in-vehicle network 5 of the vehicle C (the own vehicle) that is an inheritance destination. In a case where the communication route in the in-vehicle network 5 of the vehicle C that is an inheritance source and the communication route in the in-vehicle network 5 of the vehicle C (the own vehicle) that is an inheritance destination are the same or have compatibility, the conversion of the inheritance source network setting information is not required. In this case, the control unit 20 of the in-vehicle device 2 may generate the network setting change instruction without converting the inheritance source network setting information.

The control unit 20 of the in-vehicle device 2 outputs the network setting change instruction generated on the basis of the network setting information converted in the processing of S2061 (S2062). The control unit 20 of the in-vehicle device 2 performs the processing of S2062, as with the processing of S1061 in Embodiment 1 (the transmission and reception between the relay device 3 and the in-vehicle device 2: C).

In a case where the request of the user is not the transfer of the available service (S206: NO), the control unit 20 of the in-vehicle device 2 determines whether the received request is the storage of the service in use (S207). In a case where the request of the user is the storage of the service being used (the service in use) (S207: YES), the control unit 20 of the in-vehicle device 2 requests the collection of the relay-related information to the relay device 3 (S208). The control unit 20 of the in-vehicle device 2 requests the collection (the acquisition) of the relay-related information to each of the relay devices 3 (the transmission and reception between the relay device 3 and the in-vehicle device 2: D).

The control unit 20 of the in-vehicle device 2 acquires the relay-related information from the relay device 3 (S209) (the transmission and reception between the relay device 3 and the in-vehicle device 2: E). The control unit 20 of the in-vehicle device 2 acquires the information of the service in use (the information of the applied available service) (S210). The control unit 20 of the in-vehicle device 2 outputs the relay-related information, the information of the service in use, and the user information to the vehicle exterior server 100 (S211). The control unit 20 of the in-vehicle device 2 outputs the acquired relay-related information, information of the service in use, and user information to the vehicle exterior server 100 (the transmission and reception between the vehicle exterior server 100 and the in-vehicle device 2: F). The control unit 20 of the in-vehicle device 2 performs the processing of S207 to S211, as with the processing of S107 to S111 in Embodiment 1.

In a case where the request of the user is not the storage of the service being used (the service in use) (S207: NO), the processing of S2062 or S211 is executed, and then, the control unit 20 of the in-vehicle device 2 performs the loop processing to execute again S205.

The control unit 30 of the relay device 3 determines whether the network setting change instruction is received from the in-vehicle device 2 (T201). The output of the network setting change instruction to the relay device 3 from the in-vehicle device 2 (the transmission and reception between the relay device 3 and the in-vehicle device 2: C) is performed by the processing of S2062 in the in-vehicle device 2.

In a case where the network setting change instruction is received (T201: YES), the control unit 30 of the relay device 3 changes the network setting (T202). In a case where the network setting change instruction is not received (T201: NO), or after the processing of T202 is executed, the control unit 30 of the relay device 3 determines whether the request for the collection of the relay-related information is received from the in-vehicle device 2 (T203). The output of the request for the collection of the relay-related information to the relay device 3 from the in-vehicle device 2 (the transmission and reception between the relay device 3 and the in-vehicle device 2: D) is performed by the processing of S208 in the in-vehicle device 2.

In a case where the request is received (T203: YES), the control unit 30 of the relay device 3 collects the relay-related information (T204). The control unit 30 of the relay device 3 outputs the collected relay-related information to the in-vehicle device 2 (T205). The control unit 30 of the relay device 3 outputs the relay-related information collected on the basis of the request from the in-vehicle device 2 to the in-vehicle device 2 (the transmission and reception between the relay device 3 and the in-vehicle device 2: E). In a case where the request is not received (T203: NO), or after the processing of T205 is executed, the control unit 30 of the relay device 3 performs the loop processing to execute again the processing of T201. The control unit 30 of the relay device 3 performs the processing of T201 to 2105, as with T101 to T105 in Embodiment 1.

The control unit 102 of the vehicle exterior server 100 determines whether the user information is received from the in-vehicle device 2 (G201). The output of the user information to the vehicle exterior server 100 from the in-vehicle device 2 (the transmission and reception between the in-vehicle device 2 and the vehicle exterior server 100: A) is performed by the processing of S202 in the processing flow of the in-vehicle device 2.

In a case where the user information is received from the in-vehicle device 2 (G201: YES), the control unit 102 of the vehicle exterior server 100 outputs the available service history and the like to the in-vehicle device 2 (G202). The control unit 102 of the vehicle exterior server 100 extracts the available service history of the user that is specified by the user information transmitted from the in-vehicle device 2, with reference to the available service history table and the network setting information table. The control unit 102 of the vehicle exterior server 100 specifies the network setting information corresponding to each of the available services in the extracted available service history, and outputs the network setting information to the in-vehicle device 2, together with the extracted available service history (the transmission and reception between the vehicle exterior server 100 and the in-vehicle device 2: B).

In a case where the user information is not received from the in-vehicle device 2 (G201: NO), or after the processing of G202 is executed, the control unit 102 of the vehicle exterior server 100 determines whether the network setting information, the information of the service in use, and the user information are received from the in-vehicle device 2 (G203). The output of the information of the service in use and the like to the vehicle exterior server 100 from the in-vehicle device 2 (the transmission and reception between the in-vehicle device 2 and the vehicle exterior server 100: F) is performed by the processing of S211 in the processing flow of the in-vehicle device 2.

In a case where the information of the service in use and the like are received from the in-vehicle device 2 (G203: YES), the control unit 102 of the vehicle exterior server 100 stores the information of the service in use and the like received from the in-vehicle device 2, as the available service history information (G204). The control unit 30 of the relay device 3 performs the processing of G204, as with G105 in Embodiment 1.

In a case where the information of the service in use and the like are not received from the in-vehicle device 2 (G203: NO), or after the processing of G204 is executed, the control unit 102 of the vehicle exterior server 100 performs the loop processing to execute again the processing of G201.

The embodiments disclosed herein are exemplifications in all respects and should not be considered restrictive. The scope of the present disclosure is indicated by the claims but not the meaning described above, and is intended to include all changes within the meaning and the scope equivalent to the claims.

The invention claimed is:

1. An in-vehicle device that is mounted on a vehicle and is connected to a relay device through an in-vehicle network such that communication is available, the in-vehicle device comprising:
   a control unit performing processing relevant to network setting information used by the relay device,
   wherein the control unit:
   acquires, from a user, user information relevant to a user of the vehicle;
   outputs the acquired user information to a vehicle exterior server provided outside the vehicle;
   acquires information of a plurality of available services that can be used by the user from the vehicle exterior server;
   outputs a network setting change instruction generated based on the acquired information of the plurality of available services to the relay device;
   acquires inheritance source network setting information to be inherited to the relay device when using the plurality of available services from the vehicle exterior server; and
   outputs a network setting change instruction generated based on the acquired information of the plurality of available services and the inheritance source network setting information to the relay device;
   wherein the inheritance source network setting information includes information relevant to a communication route within the in-vehicle network specified in accordance with the plurality of available services.

2. The in-vehicle device according to claim 1,
   wherein the control unit:
   outputs the information of the plurality of available services acquired from the vehicle exterior server;

receives selection, and, by the user, of one or more available services from the plurality of available services; and outputs a network setting change instruction generated based on the selected one or more available services to the relay device.

3. The in-vehicle device according to claim 2, wherein the control unit:

converts the acquired inheritance source network setting information; and outputs a network setting change instruction generated based on the inheritance source network setting information after conversion to the relay device.

4. The in-vehicle device according to claim 2, wherein the control unit:

acquires information of an available service that has been applied to the vehicle;

acquires network setting information corresponding to the applied available service from the relay device; and outputs the information of the applied available service and the network setting information to the vehicle exterior server, in association with the user information.

5. The in-vehicle device according to claim 1, wherein the control unit:

acquires the inheritance source network setting information after conversion that is converted by the vehicle exterior server; and outputs a network setting change instruction generated based on the inheritance source network setting information after conversion to the relay device.

6. The in-vehicle device according to claim 5, wherein the control unit:

acquires information of an available service that has been applied to the vehicle;

acquires network setting information corresponding to the applied available service from the relay device; and outputs the information of the applied available service and the network setting information to the vehicle exterior server, in association with the user information.

7. The in-vehicle device according to claim 1, wherein the control unit;

converts the acquired inheritance source network setting information; and outputs a network setting change instruction generated based on the inheritance source network setting information after conversion to the relay device.

8. The in-vehicle device according to claim 7, wherein the control unit:

acquires information of an available service that has been applied to the vehicle;

acquires network setting information corresponding to the applied available service from the relay device; and outputs the information of the applied available service and the network setting information to the vehicle exterior server, in association with the user information.

9. The in-vehicle device according to claim 1, wherein the control unit:

acquires information of an available service that has been applied to the vehicle;

acquires network setting information corresponding to the applied available service from the relay device; and outputs the information of the applied available service and the network setting information to the vehicle exterior server, in association with the user information.

10. The in-vehicle device according to claim 9, wherein the control unit:

acquires information relevant to a communication state in a period of using the applied available service from the relay device; and outputs the information relevant to the communication state, the information of the applied available service, and the network setting information to the vehicle exterior server, in association with the user information.

11. The in-vehicle device according to claim 1, wherein the control unit:

acquires the inheritance source network setting information after conversion that is converted by the vehicle exterior server; and outputs a network setting change instruction generated based on the inheritance source network setting information after conversion to the relay device.

12. A non-transitory computer-readable medium storing a program that, when executed, allows a computer, that is mounted on a vehicle and is connected to a relay device through an in-vehicle network such that communication is available, to execute processing of:

acquiring, from a user, user information relevant to a user of the vehicle;

outputting the acquired user information to a vehicle exterior server provided outside the vehicle;

acquiring information of a plurality of available services that can be used by the user from the vehicle exterior server;

outputting a network setting change instruction generated based on the acquired information of the plurality of available services to the relay device;

acquiring inheritance source network setting information to be inherited to the relay device when using the plurality of available services from the vehicle exterior server; and outputting a network setting change instruction generated based on the acquired information of the plurality of available services and the inheritance source network setting information to the relay device;

wherein the inheritance source network setting information includes information relevant to a communication route within the in-vehicle network specified in accordance with the plurality of available services.

13. An information processing method for allowing a computer, that is mounted on a vehicle and is connected to a relay device through an in-vehicle network such that communication is available, to execute processing of:

acquiring, from a user, user information relevant to a user of the vehicle;

outputting the acquired user information to a vehicle exterior server provided outside the vehicle;

acquiring information of a plurality of available services that can be used by the user from the vehicle exterior server;

outputting a network setting change instruction generated based on the acquired information of the plurality of available services to the relay device;

acquiring inheritance source network setting information to be inherited to the relay device when using the plurality of available services from the vehicle exterior server; and outputting a network setting change instruction generated based on the acquired information of the plurality of available services and the inheritance source network setting information to the relay device;

wherein the inheritance source network setting information includes information relevant to a communication route within the in-vehicle network specified in accordance with the plurality of available services.

* * * * *